Sept. 20, 1966 L. L. FLAUGHER 3,273,384
MACHINE AND METHOD FOR TESTING AUTOMATIC TRANSMISSIONS
Filed March 7, 1963 9 Sheets-Sheet 1
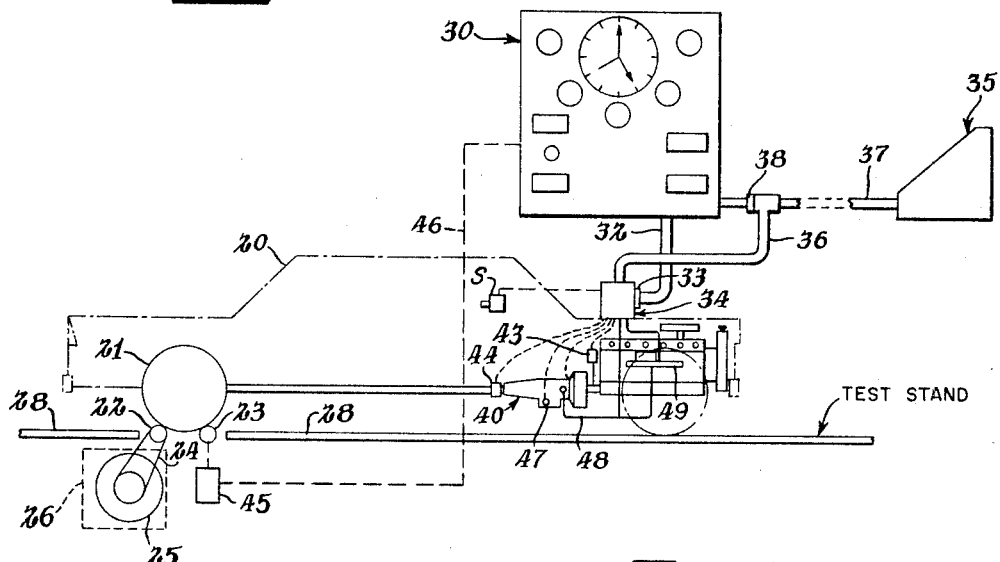
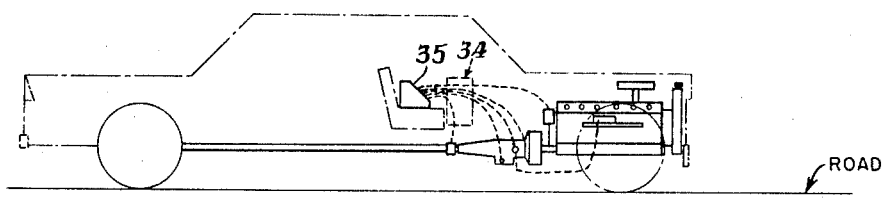
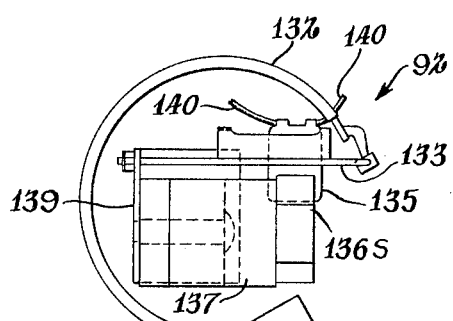
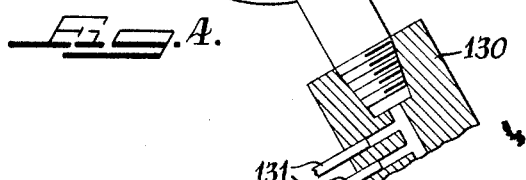
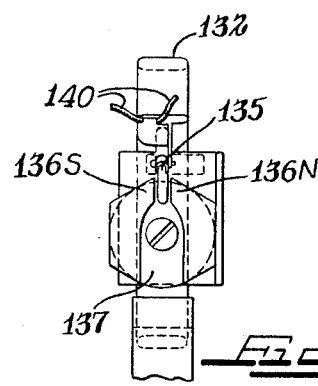
INVENTOR.
LAWRENCE L. FLAUGHER
BY
Fidler, Beardsley, Bradley, Patnaude & Petherbridge
Attys.

Sept. 20, 1966
L. L. FLAUGHER
3,273,384
MACHINE AND METHOD FOR TESTING AUTOMATIC TRANSMISSIONS
Filed March 7, 1963
9 Sheets-Sheet 2
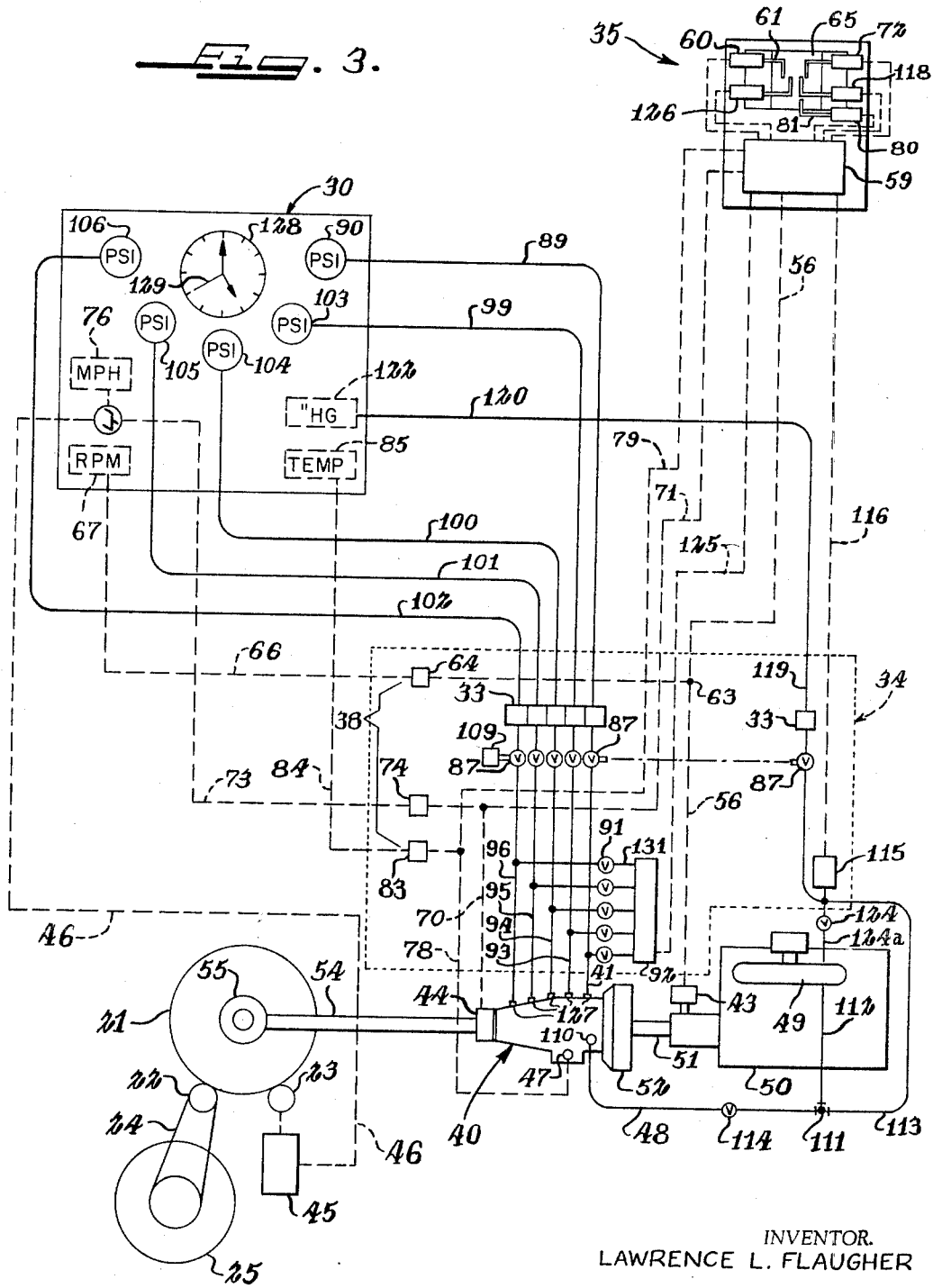
INVENTOR.
LAWRENCE L. FLAUGHER
BY
Fidler, Beardsley, Bradley, Patnaude & Petherbridge
Attys.

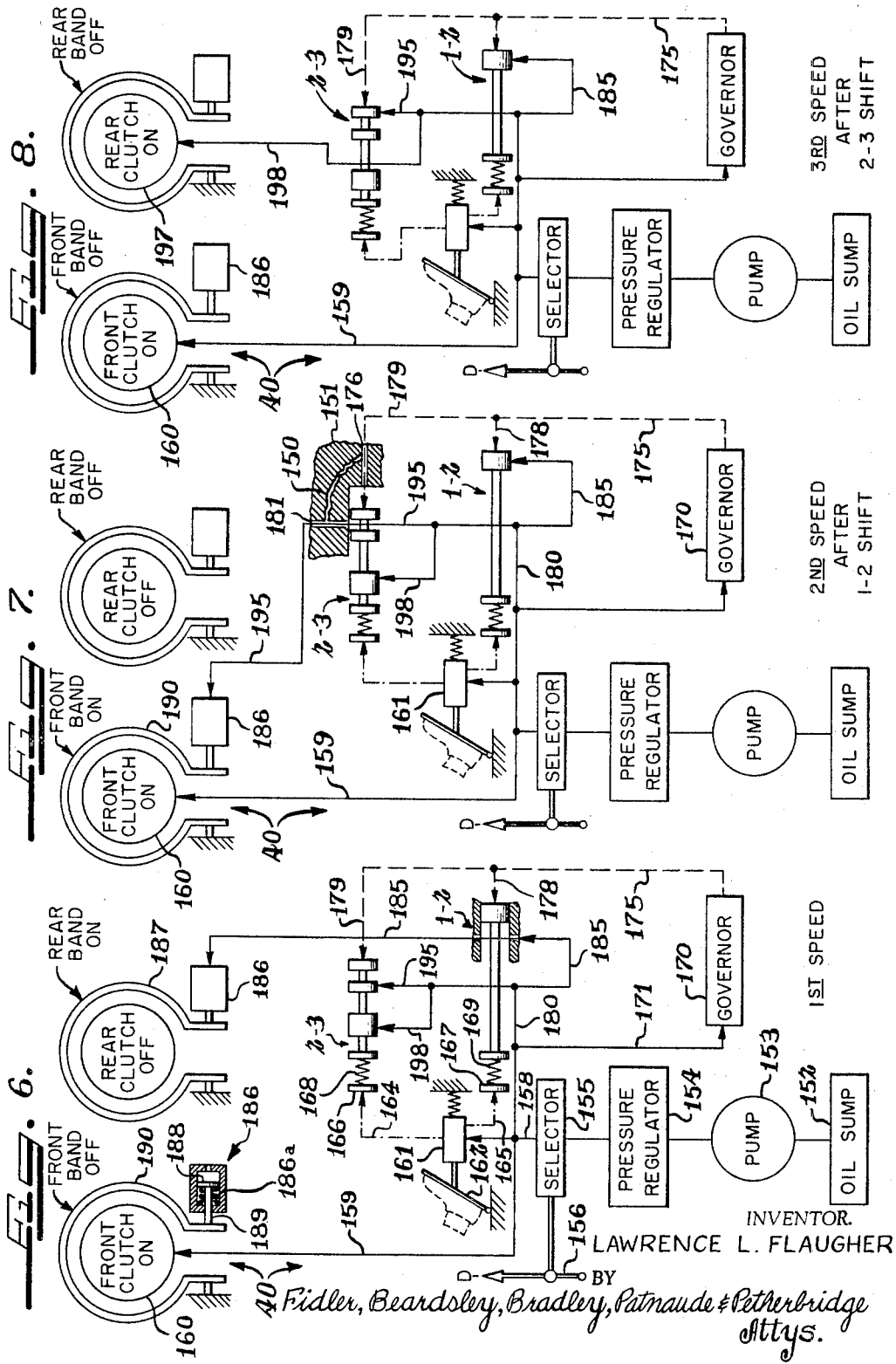

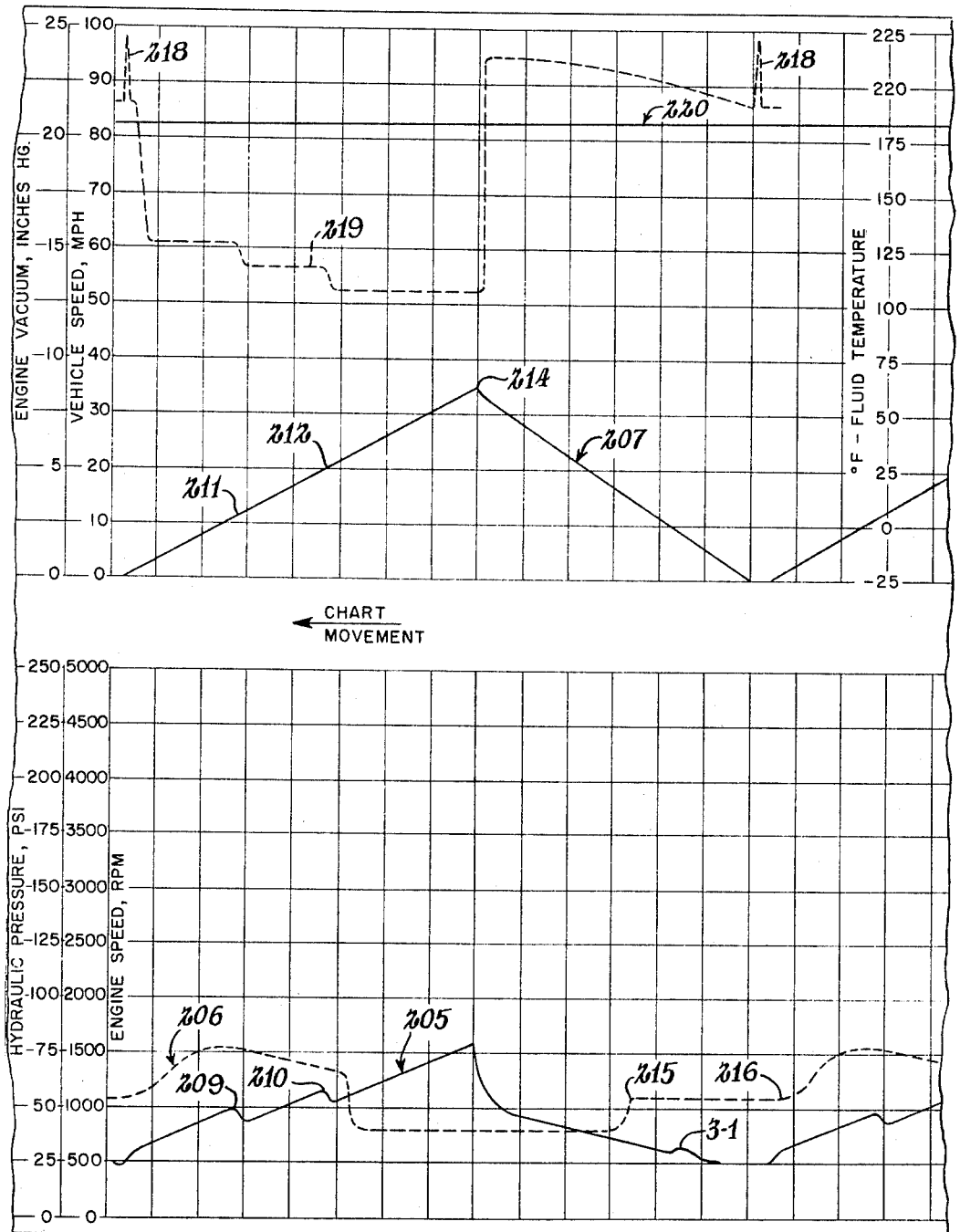

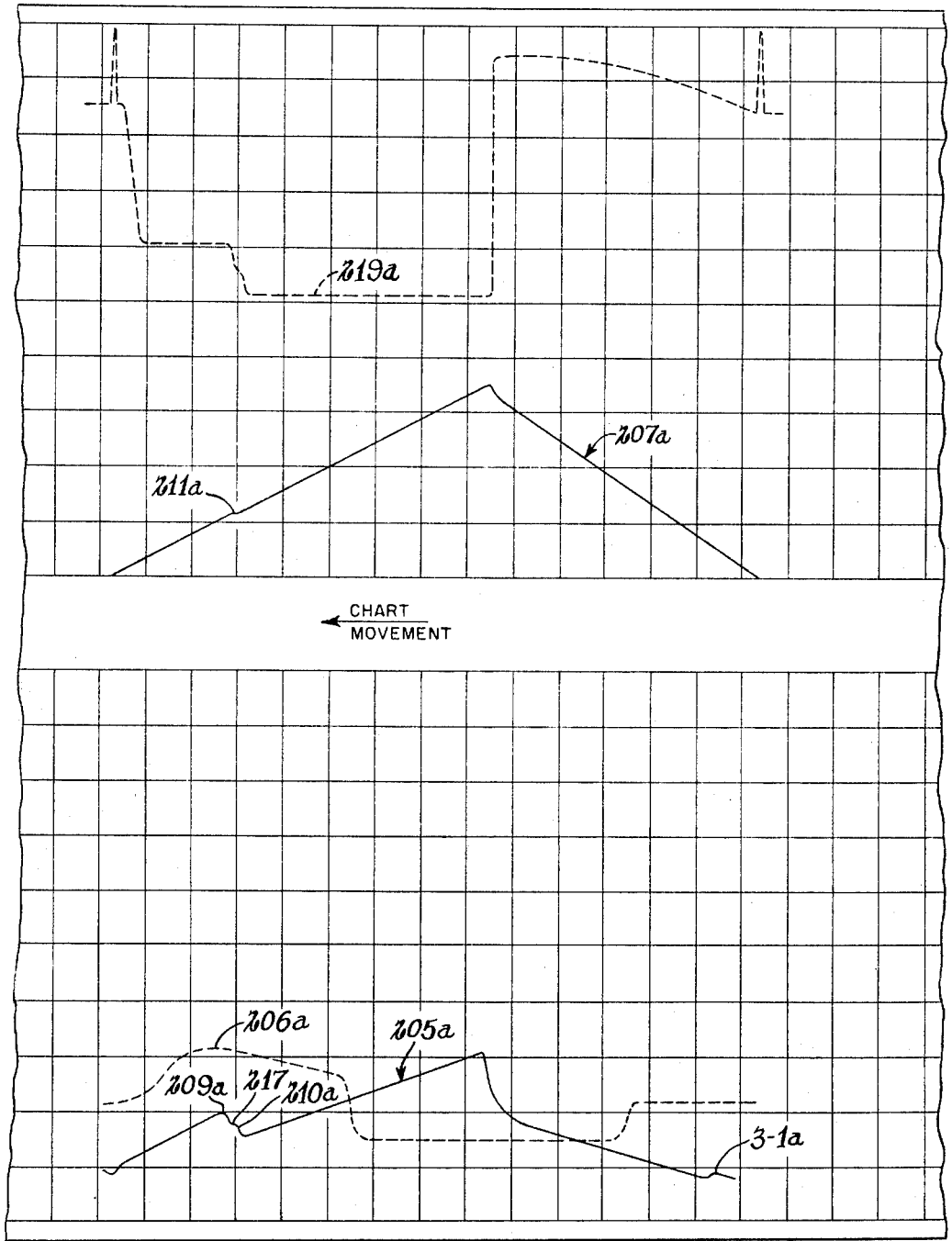

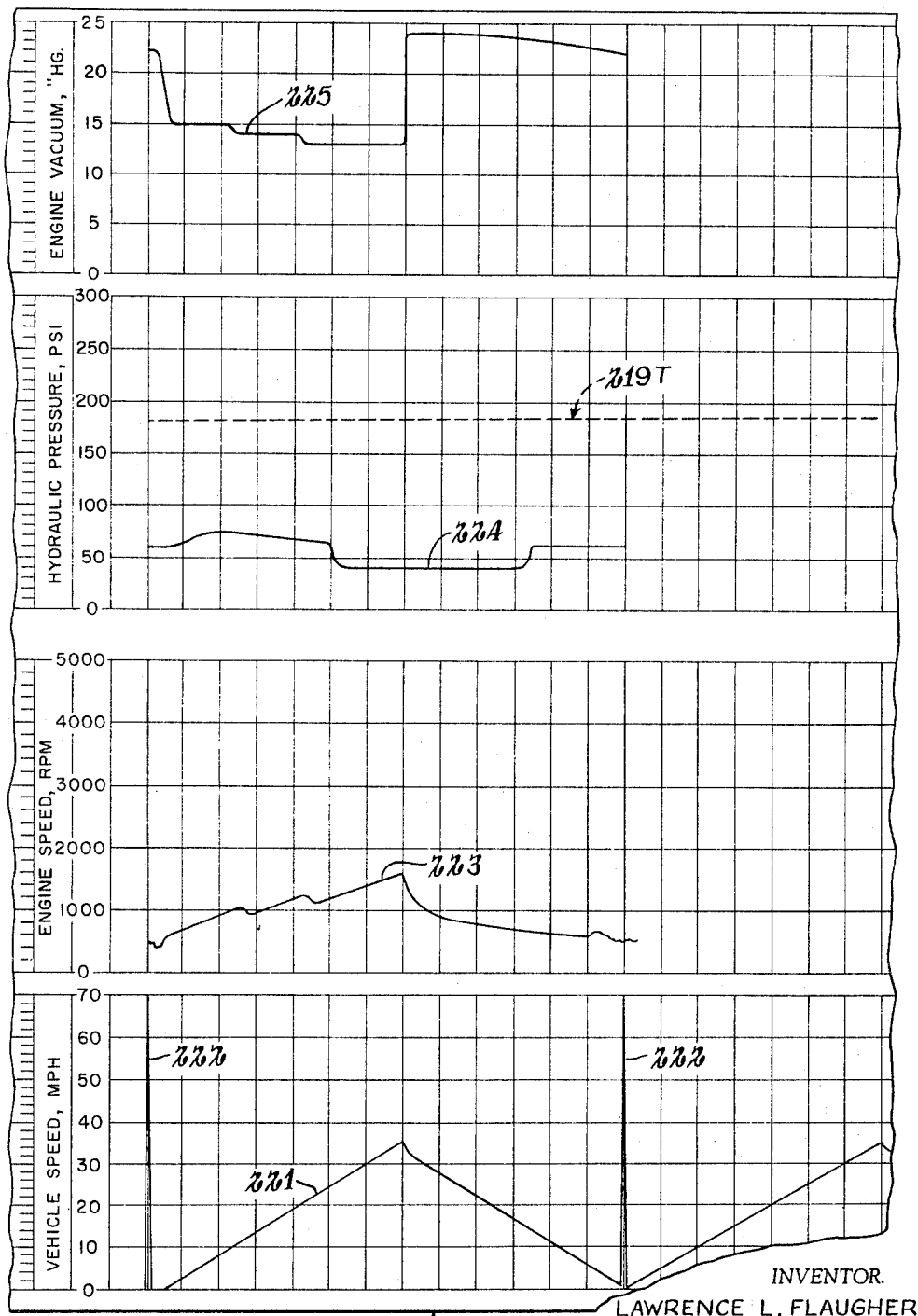

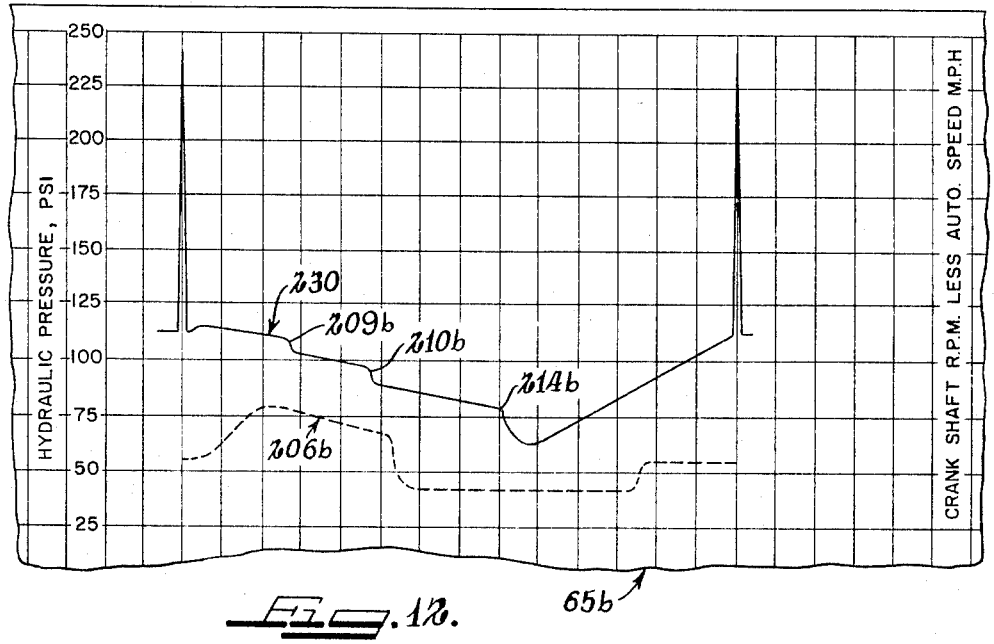
_Fig. 12._
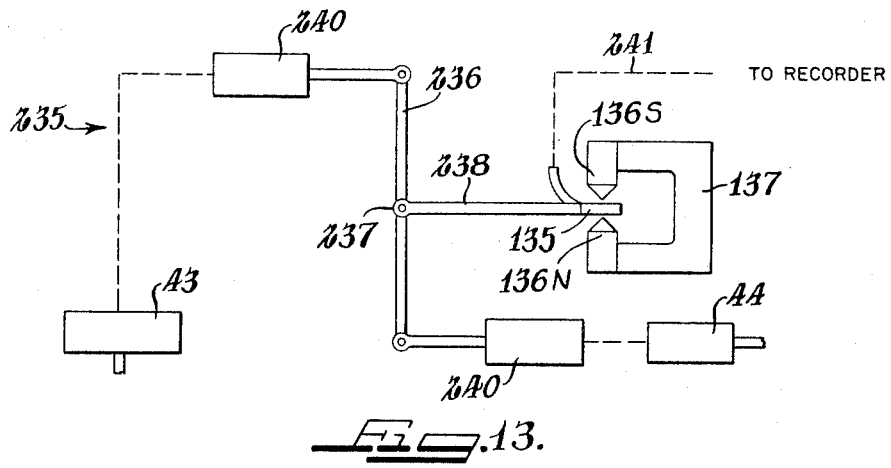
_Fig. 13._

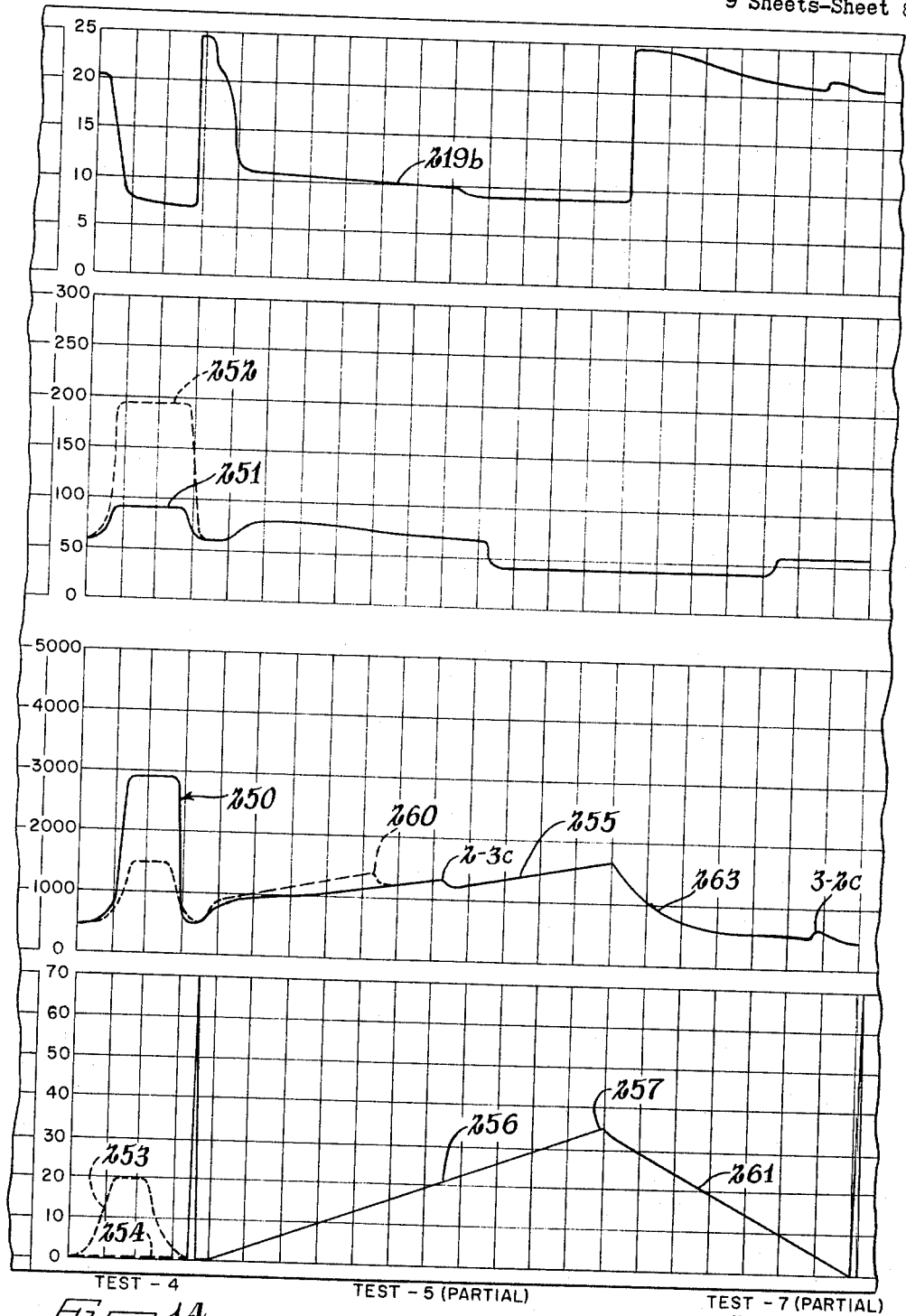

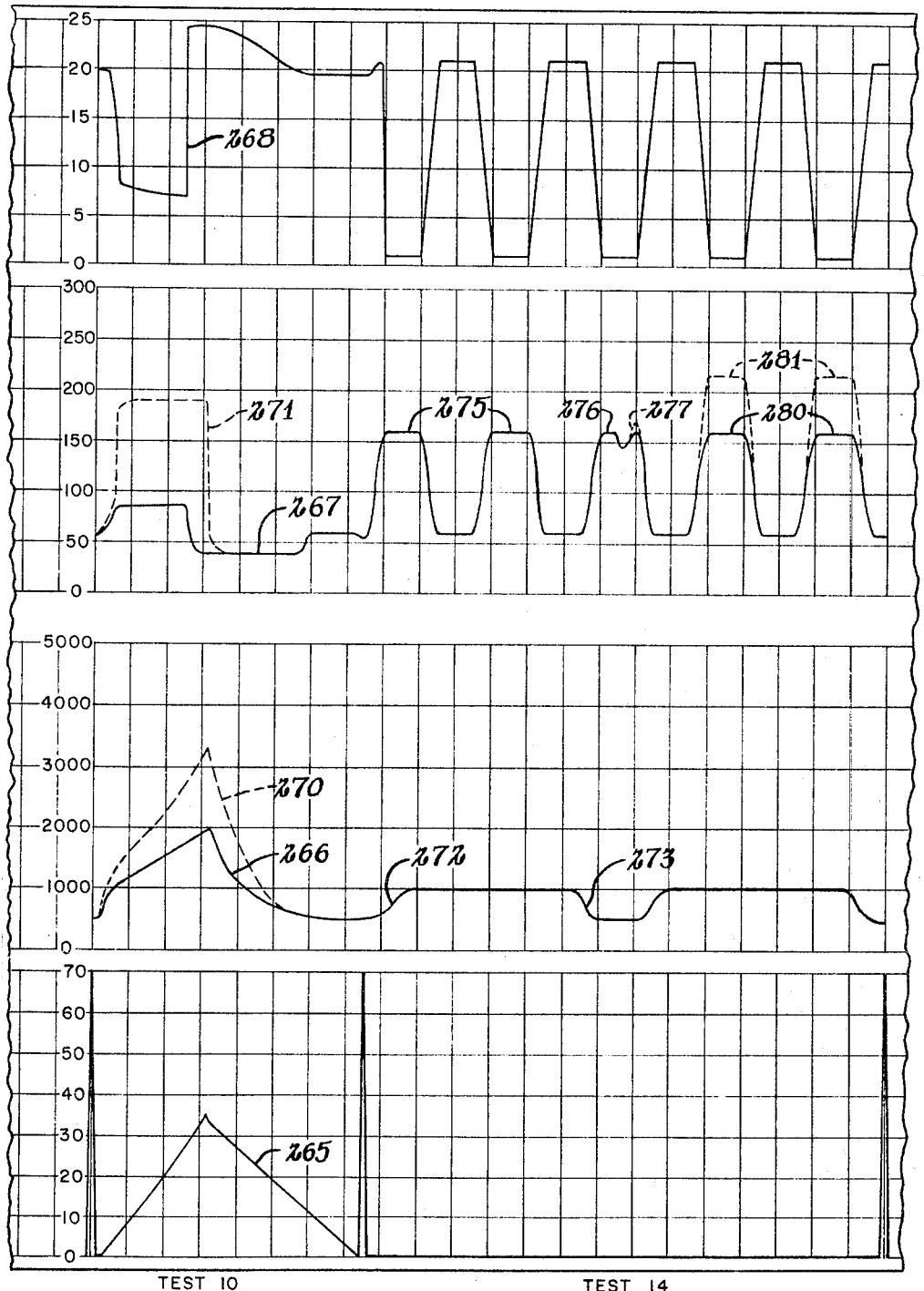

United States Patent Office

3,273,384
Patented Sept. 20, 1966

3,273,384
MACHINE AND METHOD FOR TESTING
AUTOMATIC TRANSMISSIONS
Lawrence L. Flaugher, Pewaukee, Wis., assignor to Applied Power Industries, Inc., Milwaukee, Wis., a corporation of Wisconsin
Filed Mar. 7, 1963, Ser. No. 263,547
8 Claims. (Cl. 73—118)

The present invention broadly relates to a new machine and method for testing hydrodynamically and hydrostatically activated and controlled transmissions of the kind presently used in automotive vehicles such as automobiles, buses, trucks, and kindred vehicles of several different sources of manufacture. More specifically, the machine and method are adapted for testing the automatic and semi-automatic transmissions in such vehicles in situ and either by road testing where suitable roads are available, or on a test stand where such roads are not available or use of same is not permitted or suitable for test purposes.

A broad purpose of the invention is to provide a new testing machine usable with a new testing method for enabling such vehicles to be tested with component parts in situ and under ordinary conditions of operation for establishing characteristics of operation indicative of at least three objectives of a test; namely, proper operation of components of the transmission as well as other parts of the vehicle, improper operation of these components and parts, and partial or marginal operation of same. As a result of many tests on several different makes and models of vehicles, it has been found that a mechanic of average skill and not specifically trained in the servicing of hydraulic transmissions except to the extent of performing a test program and observing results thereof, can quickly and accurately ascertain proper functioning, malfunctioning and partial or marginal functioning of the transmission and render useful advice and service to the user thereof, usually at a small expense.

The ability of even a highly skilled hydraulic transmission mechanic using presently accepted procedures and methods has not proven sufficient to ascertain many of the functionings named above and render useful advice and service at low cost. By way of one example, and not in a restrictive sense, failure to back up in a widely used vehicle, according to the manufacturer's handbook, instructs the skilled mechanic in substance as follows: Remove the pan and visually inspect the reverse band, the rear hydraulic servo-motor, the control valve body for said servo and perform an air pressure test on certain parts to find leaks. If the trouble is not found thus far the transmission is removed and disassembled to components, thereafter the rear clutch is disassembled, an internal hydraulic leak check is attempted and the fluid distributor sleeve in the output shaft is checked. This comprises substantially a complete disassembly, and parts will need repair or replacement and the transmission will need to be re-assembled with replaced seals. The labor can consume several hours and there is a substantial possibility that the malfunction will not be corrected in the event it was caused by an internal crack or leak interiorly of the transmission casing, or by a multitude of malfunctions in the control mechanism not detailed by the manufacturer. For example, if the malfunction is caused by a stuck inhibitor valve the automobile will not back up; and this specific example will be described in detail under operation.

It has further been found that some newly manufactured vehicles develop malfunctions in the hydraulic transmissions after only short usage. It is believed that at least one reason for this is the manner of testing and installing such transmissions in the vehicles. Some transmissions are tested upon a test stand at the end of the assembly line therefor, and are caused to operate by being driven by an electric motor or an engine and are provided with a hydraulic tester on the output shaft. Such tests fail to reveal defects other than external leaks and omission of parts and clearances, by following a prescribed procedure. Without known exception these use a forced flow of transmission fluid which fails to reveal malfunctions that usually occur as a result of internal hydraulic leakage. The above test procedure further fails to provide tests considering linkages later installed in the vehicle such as range selector, accelerator, the carburetor (with mechanical and/or vacuum connections) and the like. The engine connections not being made, the transmissions cannot be fully tested.

It is a broad object of this invention to provide an improved method of testing automatic and/or semi-automatic transmissions for motor vehicles in situ.

It is a further broad object of this invention in keeping with the above object, to provide an improved method of testing the transmissions in situ and of different manufacture by establishing and programming certain predetermined parameters or norms of operation, operating the transmission through a predetermined program in keeping with the program of norms, and ascertaining the operation of the transmission by comparing functions of the transmission to the norms.

Another object, in keeping the preceding objects, is to provide a printed record containing data indicative of operation of transmissions of different sources of manufacture.

Other objects and advantages of the test method reside in the steps involved in the predetermined test program and the information obtained therefrom, and will be either obvious or pointed out in the following specification and claims.

Further, it is a broad object of this invention to provide an improved machine for testing automatic and/or semiautomatic transmissions for motor vehicles in situ.

It is another broad object hereof in keeping with the preceding object to provide an improved testing machine for testing the transmissions in situ, which testing machine incorporates a method including steps that are partially automatic and partially manual and according to a predetermined mode or program of operation, to obtain a visual record of operation of a given transmission.

It is a further object, in keeping with the preceding object, to test transmissions by road testing and/or test-stand testing.

Another object, in keeping with any of the preceding objects, is to provide novel components, and/or combinations of components for rendering visual recordings of characteristics of performance of an automatic hydraulic transmission, or the like.

Other objects and advantages of the testing machine reside in details of construction and arrangement of parts and will be either obvious or pointed out in the following specification and claims.

In the drawings which illustrate presently preferred embodiments of the testing machine and samples of information produced by employing the method to be described below:

FIG. 1 is a diagrammatic view of an automobile on a test stand and being connected to function indicating and recording mechanisms, FIG. 2 is a diagrammatic view of an automobile having a recording mechanism connected therein for recording a road test, FIG. 3 is a diagrammatic view of a system for performing a test, FIGS. 4 and 5 are side and end views respectively of a pressure to electric signal transducer used in the system, FIGS. 6, 7, and 8, are diagrammatic views of parts operable to disclose the malfunction charted in FIG. 10, FIGS. 9 and 10 are charts produced by the recorder and showing proper functioning and malfunctioning respectively, FIG. 11 is a chart of different format than the chart of FIG. 9 but containing the same intelligence, FIG. 12 is a chart of different format than either of the above charts but containing the same intelligence, FIG. 13 is a diagrammatic view of a transducer for algebraically adding two indications, and FIGS. 14 and 15 are charts of a different malfunction projected on a chart of the format shown in FIG. 11.

The testing machine to be described in detail below is provided with structure, some of which is novel herewith and some of which is available from established commercial sources, that is caused to be coordinated in a predetermined program for a transmission from a specific source of manufacture. Different transmissions are provided with modified programs. However, for each there are parameters of operation for several phases or stages of operation, and while many are the same, or similar, others require substantially different parameters. Coordinately printed tapes are supplied for establishing these parameters, manufacturer's data are incorporated in the program and test data arrived at by experience with, and tests of, a large number of transmissions of a given kind, which data may also give cause to modify the program. Certain essential data such as shaft speeds and the transmission internal oil pressures are compared with these established parameters and recorded on these tapes, and conclusions can be read directly from the tapes by an ordinarily skilled operator.

The testing method to be described in detail below has resulted in the construction of the new hydrodynamic testing machine mentioned above. However, the method is not to be restricted to attainment in this machine only which records data simultaneously on a single tape, but could be performed with either more or less refined equipment and with more or less automatic control both in operation of vehicle control members and operation of recording or memory elements. The method is characterized in that a predetermined method including transmission performance parameters is established for comparison with empirically ascertained norms and test results may be printed on a tape. The transmission is operated according to an established program in such manner that actual transmission function is transduced to place indicia regarding function parameters on the tape for comparison with the norms, and the tape is read by an operator. It has been found that the method can be employed in a short time and the operation data is accurate.

The method includes comparisons somewhat in common with the use of simultaneous equations in mathematics. Each questionable performance, or non-performance of components in a hydrodynamic transmission substantially invariably involves a specific group of parts of this component. By programming operation of these parts by groups of parts, and sequentially employing them in steps of the test in different groups of parts, the faulty parts will cause their presence to be recorded by indicia on the tape. There can be one, or two, or all faulty parts, but it is significant to note that the faulty parts will be common to all tests. Accordingly, in many cases, the faulty parts will be readily ascertainable without taking the transmission apart.

As will be discussed more in detail below there are certain minimum essentials of function to ascertainment of the condition of a hydraulic transmission when it is received by a mechanic for adjustment, repair or replacement. It is economically most desirable if such ascertainment can be made with a minimum of time. The present invention uses as such minimum essentials, the crank shaft speed of the engine compared with the output shaft speed of the transmission or the drive wheels, and hydraulic pressure from within the transmission.

A strip chart, or other kind, contains coordinates to establish norms for predetermined functions and this chart is marked with indicia having function parameters showing actual response of the transmission within or without the range of these norms during a predetermined test operation. The norms are plotted for a given transmission according to this predetermined program of operation.

The time for operating a given program is 10 to 15 minutes in some cases from the time an automobile is put on a test stand until it can be removed. Thus a single stand can service a hundred or more cars a day during a twenty-four hour operation thus rendering the use of the machine and method both economical for the car user and profitable for the test stand operator.

The machine and method can also be used by fleet operators to indicate transmission rate of deterioration quite conveniently. By using same at times of periodic service, a further chart can be made containing a history of a given transmission regarding it and others of its kind. Thus, knowing the time of probable failure of such kind, a transmission can be repaired or replaced at a time sufficiently close to the time of expected failure of a part or parts to obtain the most service from the transmission, and hence effect the greatest economy of fleet operation.

It is believed helpful to make note that between the years 1955 through 1962 there were twenty-four transmissions on the market in popular makes of automobiles from different sources of manufacture. Each of these transmissions were subject to approximately one hundred and twenty primary malfunctions on the average, and each primary malfunction could be related to nearly one hundred component malfunctions. Of course, some of these are minor in nature; however, many thousands of such malfunctions can result in complete inoperability or destruction of a transmission thus requiring replacement.

Automatic transmissions are usually serviced and repaired for one of three reasons; namely, they do not shift properly, the power is not being transmitted to the drive wheels, or unusual noises are being created by or appear to come from the transmission. Each of these reasons can arise from different malfunctions.

If the transmission is not shifting properly the control system is probably at fault. Some common faults include wear or faulty adjustment of mechanical linkage, hydraulic pressure may be too high or too low, clogged oil passages, leaky seals, jammed servo pistons, and others. Manufacturers' manuals regarding such malfunctions outline dozens of things to check involving hundreds of component combinations.

If power is not being transmitted to the wheels, frictional elements including bands and/or clutches may be out of adjustment or worn or not being applied with sufficient force to hold them securely, which latter can be due to many further malfunctions of the hydraulic and control systems. Again, manuals concerning same outline numerous parts to check.

Unusual noises can be created at numerous points in the several components of the transmission due to wear, breakage, etc. In addition, the engine, drive shaft, differentials, etc., can create vibrations in resonance with transmission parts so the transmission becomes the sounding board therefor. Present procedure instructions do not advise steps for determining apparent malfunctions in the latter regard.

The present machine and method enable an operator to make a quick test and chart analysis to ascertain acceptable transmission performance within predetermined parameters; as well as determine malfunctions.

A specific example of an apparent malfunction that can remain in a tolerable range or degree of malfunction is slippage which can be caused by either inefficient mechanical operation or inefficient hydraulic operation and can be in the torque converter, the hydraulic transmission or partially in both. The skilled transmission mechanic cannot find a specific cause or provide correction under many of such conditions. However, it is significant to note, the malfunction may not be conducive to inordinately expensive operation, or inexpensive repair. The degree of inefficiency may be small and the cost of replacement or repair large as compared to expenditures for fluid and gasoline. The present testing machine can ascertain such slippage and determine its cause: When the transmission is functioning properly the fault is invariably in the torque convertor.

In the disclosure below only two specific examples will be described in detail going into transmission components and functions thereof. It is to be noted that these examples (and others) have had norms and parameters comparable therewith empirically established from manufacturer's data and actual experimentation. Other related, as well as different, norms and parameters have been heuristically projected from the above data. In this manner, with further actual tests in projected areas, data is pyramided, and it has been found that predictions can be made accurately for transmissions at an early date after introduction or design of same which is a further advantage of the present machine and method.

In addition to the above-mentioned malfunctions, it is to be noted that the temperature of a transmission and parts and fluid therein can also cause malfunctioning. Certain transmissions will perform within tolerable limits in one range of temperature; but the same will malfunction in another temperature range usually higher than the first mentioned range such as occurs after driving some distance or during hot ambient temperatures. The present invention renders such malfunctions ascertainable and hence correctible; whereas present procedures are incapable of rendering such function. Accordingly, another advantage of this invention is to ascertain operation characteristics in different temperature ranges during operation.

In keeping with instructions contained in service manuals and charts furnished by manufacturers, and further in accordance with findings resulting from many tests of transmissions of different sources of supply, a program including significant characteristics of normal, abnormal, and partial operational function has been ascertained. As mentioned briefly above and as presently presented, but not in a restrictive sense, a minimum of two functions are required, these being; the difference in vehicle speed with respect to engine r.p.m., and a pressure indicative of operation of the pump supplying primary fluid under pressure to transmission components. Either of these functions, of course, can be ascertained by proper connections at different points in the power train from engine to drive wheels and from a suitable connection in communication with the primary fluid pressure source. This combination of elements and the method of testing embracing these functions form the basis of broad claims hereinafter annexed.

In addition to the above two major cooperative functions, there are other significant functions set forth below; but not necessarily in the order of diminishing significance. Further, it is to be understood that all transmissions do not have connecting means for using conveniently all of these functions for test purposes, whereas a few have more than enough connections.

Engine r.p.m. alone is conveniently ascertained from the distributor or spark plug circuitry, or elsewhere, and is preferably, although not necessarily, electrical in output to readily operate commercially available indicating mechanism for giving discrete visual indications and/or positioning a stylus or the like for marking a chart.

Automobile speed alone is conveniently ascertained from the speedometer drive mechanism on the drive shaft or from a generator driven by the drive wheels of the vehicle and is also preferably electrical in output for the reason expressed immediately above for giving discrete visual indications and/or positioning a stylus for marking a chart.

Other significant pressures that can also indicate functioning of transmission components include the pressure controlled by the internal centrifugally activated governor and the pressure controlled by throttle positioning. These, as well as the pressure of the pump mentioned above, affect, and accordingly expose defective operation of component parts detracting from what is trade-termed "Smooth Operation."

Still other significant pressures are those controlling the operation of clutch servos and band servos which can supply significant information regarding power transfer, clutch and band wear, and the like.

Other conditions are susceptible to automatic detection and indication and are of major significance; but are at present preferably ascertained by the mechanic, with the exception of primary fluid temperature which is indicated and recorded. These include oil in the cooling system indicative of fluid cooler leaks, burned odor of the fluid indicating excessive heating indicative of cooling passage blocks, noises that can be stethoscopically oriented in some cases, observation of oil level, foreign matter, etc., these conditions being herewith noted as steps normally employed in conjunction with the test method claimed in the annexed claims.

Referring now in detail to the several figures of the drawings, and first to FIG. 1, an automobile 20 is shown with its rear wheels 21 in engagement with a pair of transverse rollers 22 and 23, which rollers are preferably somewhat wider than the widest spacing of rear wheels on commonly used light vehicles such as automobiles, small trucks, and the like. The roller 22 is connected as by a chain 24 through suitable sprockets to an inertia device 25, suitably mounted within a box 26 that can contain different sized sprockets, for example, and/or multiple fly wheels, whereby to provide different ratios of inertia for simulating automobile inertia when driven along a road. The rollers 22 and 23 are transverse of a pair of tracks 28, only the right-hand one of which is shown, and suitable lock-down means can be provided, for example, at the front axle or elsewhere of the vehicle to prevent same from accidentally leaving the position shown with the drive wheels 21 in engagement with the rollers 22 and 23. Such lock-down is believed to be obvious and has not been shown.

A direct and instantaneous reading operation indicator 30 is preferably located adjacent the left-hand side of the vehicle near the driver's position therein. The indicator 30 contains different gauges and a clock, to be described more in detail in connection with FIG. 3. Hydraulic tubes for transferring pressures to the pressure gauges in the indicator 30 may be carried in a conduit 32, that may be carried in a conduit 32, that may have a quick connection 33, to an electric and hydraulic switching box 34. A remote indicator 35 is electrically connected to the switching box 34 through suitable cables 36 and 37, the latter of which may be of substantial length. The recorder 35 is adapted to make a permanent record of a given test of a vehicle as by printing same on a tape or chart of the like, and will also be explained in more detail in connection with FIG. 3. The conduit 36 is also connected through a quick connection 38, which is in communication with the electrically actuated indicators and gauges in the indicator 30. The switching box 34 is preferably located adjacent the automobile and connections thereto are diagrammatically indicated by solid lines indicating pressures, and broken lines indicating electrical signals.

The primary fluid or line pressure of an automatic hydraulic transmission 40 is connected through a tube 41 FIG. 3, to the switching box 34, wherein it is transduced from a pressure to an electric signal, by a transducer to be described more fully in connection with FIGS. 3, 4 and 5. In addition to the primary pressure 41, there may be other pressures to be described below that can be read on gauges on the indicator 30 and recorded by the recorder 35. The engine r.p.m. is taken from the ignition system and diagrammatically indicated from the distributor 43. The car speed is taken at two places, the first being the speedometer connection 44, and the second being a generator 45, which is connected through a cable 46, directly to the indicator 30, and a speed indicating device 76 therein. Either one, or both, may be connected with the recorder 35.

As mentioned briefly above, the two major functions of a transmission, indicative of proper functioning of malfunctioning, are the difference between car speed and engine speed, and the line pressure indicated through the tube 41. This pressure is generated by the front pump of automatic transmissions and operates the various clutches and bands, and will be described more in detail below. As indicated in FIG. 3, the car speed and the engine shaft speed, are taken separately. However, these can be mechanically algebraically added as will be described in more detail in connection with FIG. 13.

In addition to these functions mentioned above, certain transmissions are vacuum modulated and the vacuum pressure is, accordingly, indicative of proper and improper functions of certain parts. This pressure is taken from the vacuum modulator attached to the transmission and can be checked by sampling the intake pressure in the engine manifold 49. The temperature of the fluid in the transmission also may indicate proper and improper functioning and such temperature may be suitably taken in the sump of the transmission by an electric indicating thermocouple 47, or the like.

FIG. 2 shows the car 20 being subjected to a road test and for which the switching box 34 and the remote recorder 35 are disconnected from the indicator 30 and placed within the right front compartment of the vehicle. In this use of the mechanism, the operator does not have the instant indication as provided by the device 30, nor does he have the clock thereof for programming the operation of the test. However, a stop-switch type wristwatch can be used to take the place of the clock. The recorder 35 will make substantially an identical record of the test program as will be made on the test-stand 28. The details concerning the machine and the operation thereof will be discussed more fully immediately below.

Referring now to FIG. 3, parts similar to those explained in connection with FIG. 1, bear identical reference characters. The engine 50 turns a crank shaft 51 which operates a torque convertor 52 that drives the mechanism within the automatic transmission 40, which in turn drives an output shaft 54, that in turn, through conventional differential gearing 55 turns the driving wheels 21, all in well-known manner but differing only in magnitude or characteristics of functions associated with different torque convertors 52 and automatic transmissions 40.

The distributor 43 will supply electrical pulses to a conductor 56 leading to the amplification system 59 in the recorder. The amplification system is of conventional type and is connected with a galvanometer 60, for example, for driving a marking device 61 with respect to a moving chart 65, which chart will be explained more in detail below. The recorder 35, the multiamplifier 59, the pen drive mechanism 60, the tape 65, and parts associated therewith are commercially available from different sources. It is preferred at this time, however, that the chart 65 be a strip chart provided with Cartesian coordinates. It is within the scope of the invention, however, that different mechanism, including disc-type charts, or non-Cartesian coordinated charts, can also be used; and further it is within the scope of the invention to do other functions than mark a chart such as furnishing data on tapes or cards as by punching or magnetizing, or the like, for read-out in commercially available data processing machines.

The conductor 56 is further connected at a junction 63 through a quick connect coupler unit 64 to a conductor 66 to an electrical r.p.m. indicator 67, within the indicator 30. In similar manner, the speedometer connection 44 may supply electrical signals to a conductor 70, connected with a conductor 71, to the amplifier 59, and hence to a vehicle speed marking device 72. A conductor 73 is connected with a quick connect device 74 and a two-way switch 75 which indicates miles per hour on an electrically operated indicator 76 in indicator 30. The switch 75 can be placed in its opposite throw and connected with a conductor 46 to the generator 45. While this does not have a direct bearing on a test of a given vehicle, this amounts to a speedometer accuracy test. Proper correction of the speedometer of a given kind of transmission from a single source of manufacture can render road tests and test stand tests quite accurate as a group. Accordingly, this speedometer correction aids in establishing norms and reading parameters of functions of a transmission.

A third electrical signal is indicative of temperature of a thermocouple or the like, connected to the sump at point 47 and fed through conductors 78 and 79 to the amplifier 59 and to a temperature indicating device 80 which is shown as driving a marking device 81 that is lagging with respect to time on the chart which is driven downward within the recorder. Inasmuch as temperature does not change rapidly, it is not particularly important that it be mounted relatively close to the other indications, most of which have instantaneous response to certain conditions indicative of functions of the transmission and certain engine parts. The conductor 78, through a quick connect coupling 83, and a conductor 84, indicates temperature on a gage 85 within the indicator 30.

While other functions may be electrical in nature, or electrically transferred from the switching box 34 to the indicator 30, it is presently preferred that the hydraulic pressures of the line fluid and the vacuum pressures be directly connected so as to afford a check of the indicating mechanism 30, as well as the recorder 35, to give a check of operation of either. It is also desirable to have a switch S, FIG. 1, connected through the conductor 36, to the recorder 35, to control operation thereof inasmuch as all portions of tests need not be in the form of a record but are suitably indicated on the indicator 30.

The primary fluid pressure in the tube 41 connects with a shut-off valve 87, and in turn to a quick connect coupling 33, to a tube 89, communicating with a pressure gage 90, that may be a conventional Bourdon tube to give direct readings of primary pump pressure. A valve 91 is one of five valves V connected from a pressure-electric transducer 92 (to be described more fully below) and to tubes 93, 94, 95, and 96 and through quick connect couplings 33, to tubes 99, 100, 101, and 102, respectively. These latter tubes connect to other Bourdon gages 103, 104, 105, and 106, respectively, in the indicator 30 and indicate other pressures. The transducer 92 communicates with only one of the valves 91 at a time, preferably, to respond to different pressures indicative of malfunctions in transmissions of different manufactures. The valves V may be of plug-cock type, and the valves 87 may be of similar conventional kinds and ganged together in the latter case for simultaneous opening and closing by handle 109. The vacuum pressure from line 48 normally communicates with a connection 110 in the vacuum modulator connected with a tube 48 in turn connected by a T 111, through a tube 112, to the intake manifold 49. The vacuum modulator is also connected through a plug-cock valve 114 and a tube 113, to a pressure-electric transducer 115, similar to the transducer 92, and by electrical conductor 116 to the amplifier 59 and the vacuum pressure indicating mechanism 118 in the recorder 35.

A tube 119 is connected to a valve 87, through a quick-connect coupling 33, through a tube 120, to the Bourdon tube vacuum gage 122 in the indicator 30. The valve 114 is normally open and a normally closed valve 124 in communication with the tubes 119 and 112 and the manifold 49 through a tube. In the event there are circumstances indicating that the vacuum indicated by the vacuum modulator is substantially incorrect or fluctuating abnormally, the valve 114 can be closed and the valve 124 opened to check the engine functions at the intake manifold 49 regarding vacuum. This is accordingly a convenient means of checking the function of the vacuum modulator mechanism with respect to engine air intake pressure.

Although the major portions of functions, both proper and improper, can be read from the primary fluid pressure through the tube 41, the lower valve 91 through the pressure transducer 92 to an electrical conductor 125, to the amplifier 59, and to a record indicating device 126 in the recorder 35; there are other functions on different transmissions or at different places in a single transmission that can be posted and more readily be ascertained by reading other pressures from other take-off points in the transmission indicated at 127. The major pressures employed in different tests besides the primary pump pressure are clutch pressure, governor pressure, throttle and band servo pressure. It is to be noted, however, that not all transmissions provide this number of connections; whereas certain manufactureres provide more. Twenty-four basic transmissions are listed alphabetically below from A, B, to W, X. It is to be understood that there may be several varieties of each using modified parts, additional parts, etc.

CHART A

| Basic Type | Pressure Connections | | | | | | | |
|---|---|---|---|---|---|---|---|---|
| | Line Pressure | Throttle Pressure | Governor Pressure | Band Pressure | Clutch Pressure | Convertor Pressure | Stator Pressure | Lubrication Pressure |
| A | X | X | X | | | X | | |
| B | X | | | | X | X | X | |
| C | X | | | X | X | | X | |
| D | X | | | | | | | |
| E | X | | | | | | | |
| F | X | | | | | | | |
| G | X | X | | | | | | |
| H | X | | | | | | | |
| I | X | X | | | | | | |
| J | X | X | | | | | | |
| K | X | | | | | | | |
| L | X | X | X | | X | X | | X |
| M | X | X | X | X | X | | | |
| N | X | | | | | X | | |
| O | X | X | | | | | | |
| P | X | | | | | | | |
| Q | X | | | X | X | X | | |
| R | X | X | X | | X | | | X |
| S | X | | X | X | X | | | |
| T | X | | X | X | X | | | |
| U | X | | | | | | | |
| V | X | X | X | X | X | X | | |
| W* | X | | | | | | | |
| X | X | | | | | | | |

It is to be noted on Chart A that all of the above basic types of transmissions have a line pressure which is the primary pressure created by the front pump of a transmission. Certain of the pressures are those of the torque convertor and the lubrication system in the transmission. It has not been found necessary to make use of these connections except to take direct readings, but it has been found very helpful in defining certain malfunctions. Other oil pressures are also used to make a permanent record by the recorder 35 of the functions thereof under certain conditions of malfunctions of a transmission. The equipment diagrammatically shown above, is used in the operation of a standardized test having certain portions run for predetermined periods of time during the road tests.

In connection with FIG. 3, a stop-watch can be used by the operator. On the test stand, a clock 128 is adjacent the left-front occupants position in the automobile and it can be provided with a reset second-hand 129 that is returned to zero after each portion of a test. However, the second hand can be conventional, which latter requires the operator to add seconds and minutes in some instances for a given step in a program, and is more conducive to error than the stop-watch type second-hand 129.

Referring now to FIGS. 4 and 5, the transducer 92, is in all respects except a manifold 130 identical to the transducer 115 in the vacuum line 113, 114, etc. The manifold 130 is connected through tubes 131 (only two of which are shown) to valves 91, FIG. 3. A conventional Bourdon tube 132 is connected to a link 133, which moves a transducer 135 to a greater or lesser extent between poles 136–N and 136–S of a magnet 135 that is suitably secured to a bracket 139 in turn mounted to the case, now shown, which also support to Bourdon tube manifold 130 and the magnet 137. An increase in pressure within the Bourdon tube will move the transducer 135 upwardly and conversely, a reduction in pressure will move the transducer 135 downwardly. Suitable leads 140 are provided for the electrical magnetic transducer 135 and these are connected through connections 125 and 116, FIG. 3 respectively, from transducer 92 and 115, respectively, to the amplifier 59 in the recorder 35, to cause signals to be transferred thereto with a minimum of signal aberration. It is anticipated that the recorder may be located as much as miles away from the point of tests in a central office wherein data is more readily available and processed by office personnel rather than by mechanical personnel who operate the vehicles tested. While the one transducer disclosed is a Hall-effect generator operable upon the principal intercept by area of a number of magnetic lines of flux, it is also possible to utilize differential transformers or galvonometer type mechanisms to perform the same or similar functions responsive directly to transmission performance and thus permit a remote recording by electrical means.

Two examples are to be given below concerning two malfunctions caused by conditions not covered by the manufacturers' manuals and charts; and in order of discussion: 1st, an internal leak into the governor fluid circuit and causing faulty shifting from first to third speeds; and 2nd, a no-backup condition caused by a struck-closed inhibitor valve. Regarding the 1st condition the manuals and charts are silent, and the skilled mechanic, by trial and error, will usually adjust control linkages. However, the condition will not be corrected thus, so the mechanic will remove the pan, inspect and recondition parts, i.e., overhaul; but the malfunction will remain. It is to be noted that this particular transmission (W in the chart above) lacks a connection for reading governor pressure, and governor replacement will not correct the malfunction. Regarding the second condition, there are eight probable faults listed in the manufacturer's manual, but a struck inhibitor valve is not listed.

Automatic and semiautomatic transmissions shift (i.e., change their speed and torque ratios) in a predetermined pattern in response to the balance of forces produced on control mechanisms by speed (governor) responsive and throttle responsive hydraulic pressures. A multitude of oil circuits within various components of the transmission are utilized to transfer the governor and throttle pressures from their source of generation to the controls on which they act to cause the shifts.

A three-speed transmission would normally have a 1–2 upshift and a 2–3 upshift at engine speeds and vehicle speeds that would assure continuity in the rate of acceleration of the vehicle. The pattern of these shifts could be affected by malfunctions at the source of generation of the speed responsive hydraulic pressure or throttle responsive hydraulic pressure, by cross-leaks between oil circuits that raise or lower either of the pressures after they have left their control valves, by internal leaks from an oil circuit to the oil sump or by valves that stick and thereby affect the balance of forces needed to cause the valve to function. The remedy for each cause of a distorted shift pattern involves a different form of repair of different components within the transmission. The list of possible causes of a shift from first speed to third speed (1–3 upshift) is different from the list of possible causes of a shift from first to second then immediately to third (1–2–3 upshift.) Either of these malfunctions could occur within less than one second.

The manufacturers of three speed transmissions provide service manuals for use by skilled mechanics in the diagnosis and repair of transmission malfunctions. Many typical malfunctions are listed therein. Associated with each malfunction is a list of probable causes. In most every case some of the causes listed are of a nature that the transmission must be disassembled to determine whether this is the cause of the malfunction in question. If an examination were made for such a cause, it would require several hours of a skilled mechanic's time. This is one of the reasons why it is currently a wide-spread practice to explain to the owner of a vehicle the possible causes of the malfunction then bargain with him in an attempt to get his permission to leave the transmission for repair and let the mechanic set the price of repair after he has found how many hours were needed to find and correct the cause or causes of the malfunction. Vehicle owners often object to giving a mechanic latitude of decision.

As pointed out above, there are but a limited number of malfunctions listed in the manufacturer's service manuals. A 1–2–3 shift malfunction, for example, is not listed. It is recognized that a skilled mechanic, using the visual indicating gages recommended by the manufacturer, could not distinguish between a 1–3 shift malfunction and a 1–2–3 shift malfunction. The mechanic needs to have an intimate knowledge of the detailed functional operation of the transmission and use deductive reasoning to determine where to start looking for the causes of such a malfunction. Not being able to accurately define the malfunction, he must look to many extraneous potential causes. When the malfunction is an intermittent occurrence, as caused by sticking control valves, it is virtually impossible to do anything less than disassemble and examine all parts in detail.

Referring now to FIGURES 6, 7, and 8, parts of the automatic transmission are shown schematically, line pressure being shown by solid lines, governor pressure being shown by broken lines, and throttle pressure being shown by dot-dash lines. A crack 150, FIG. 7, is shown in a portion of the block 151 of the transmission 40, which crack extends between two passages for oil pressure in the block and will be pointed out specifically below.

The primary control fluid is drawn from a sump 152 by the main pump 153 and is directed through a pressure regulator 154 to a selector valve 155, controlled by suitable linkage shown as the control indicator 156 positioned in the drive position D. With the selector valve in this position, line pressure is delivered through a passage 158, through a passage 159, to apply the front clutch 160.

The fluid under pressure is further directed to the throttle valve 161, controlled by a foot pedal 162, and in this instance held in a fixed position by the operator's foot. The throttle valve 161 will apply reduced pressures through passages shown by dot-dash lines 164 and 165, respectively, to pistons 166 and 167, respectively, of the 2–3 shift control valve, and the 1–2 shift control valve. The symbols 2–3 and 1–2 meaning, respectively, that 2–3 controls shifting from second speed to third speed, and 1–2 controls shifting from the first speed to the second speed. The pressure applied to pistons 166 and 167 will apply pressures to springs 168 and 169 within the respective valves which pressures are opposed at opposite ends of the valves by governor pressure supplied from a governor 170 driven by the output shift of the transmission. Pressurized fluid is supplied from line pressure through a passage 171, to supply regulated pressure depending on vehicle speed, through a passageway 175, which, at least in part, is drilled at 176, FIG. 7, through the block 151. Thus governor pressure is applied to the right ends of the 1–2 and 2–3 valves through passages 178 and 179. A line pressure supply conduit 195 passes through the block 151, through a passageway 181, which is shown as in communication with the crack 150, FIG. 7, and thus that part of the governor control pressure in passageway 176. The line pressure is shown as passing through the 1–2 valve, FIG. 6, through passageway 185, and is applied to a servo 186 to cause the rear band 187 to be in engagement with its drum, not shown. The servo 186 is shown broken away in the front servo which comprises a casing 186a containing a piston 188 for moving a stem 189 to position the front band 190. Each of the servos can be substantially identical, and hence only one is shown in diagrammatical section. With line pressure supplied to the front clutch and the rear band as shown in FIG. 6, the transmission is positioned to start the vehicle in motion in first speed and the vehicle, accordingly, will be accelerated. As it accelerates, the governor 170 will, under ordinary and proper operation, move in a given period of time to build pressure up in lines 175, 176, 178, and 179, FIG. 7, to put pressure on the 1–2 control valve, and 2–3 control valve biasing them toward the left in opposition to the pressures represented by springs 169 and 168, respectively. With this opposing pressure built up with increasing speed of the vehicle, the valves will shift into the positions indicated in FIG. 7. However, because of the crack 150, the line pressure will be fed from the conduit 195 to the conduit 176, and the governor pressure will be increased an amount dependent upon the quantity of fluid leakage through the crack 150.

In FIG. 7 the parts are shown as they would be in second speed with the manual control valve 161 held in the same position as in FIG. 6. The line presure will be supplied to maintain the front clutch 160 on under influence of pressure in line 159, and the rear band will be off and the front band will be on as a result of movements toward the left of the 1–2 and 2–3 shift control valves. The line 185 is shut-off in the 1–2 valve, and a line 195, in communication with line pressure supply 180, will be opened at the 2–3 shift control valve to supply pressure to the front band servo 186 to cause the band 190 to engage its drum, not shown. In this position of component parts of the transmission, the vehicle will be in second speed and tending to accelerate still further to cause the governor 170 to supply a higher pressure to the supply conduit 175. However, again because of the crack 150 in the block, leakage from line 195 to the conduit 176 will cause the governor pressure to be increased and immediately cause the transmission to shift to third speed, FIG. 8.

In FIG. 8 the parts are shown positioned to cause the vehicle to operate in third speed. In this position, the front clutch is on, as it was in FIG. 7, but the front servo 186 is off and the rear clutch 197 is on, being supplied with line pressure through a passageway 198 in the 2–3 shift valve which at the same time interrupts fluid flow in passage 195. In this position, the gears are interlocked by the front and rear clutches and a direct drive will be in effect from the torque convertor to the transmission output shaft.

Because the crack 150 in the block 151 caused leakage from the line pressure supply side to the governor pressure supply side, the governor will have failed to correctly perform its intended function. Depending upon the size of the crack 150, the function can vary substantially. Shift valves are position by the interaction of speed-sensitive hydraulic pressures in opposition with a throttle-sensitive hydraulic pressure plus spring force. When vehicle speed has increased sufficiently for governor pressure to have moved the 1–2 and 2–3 shift valves, line pressure, being greater in value than governor pressure, opens crack 150 through conduit 181 and enters conduit 176. Governor pressure thus increases to the value of line pressure causing the 2–3 shift valve to be moved further to the left. Since governor pressure is normally sensitive to vehicle speed, the sudden increase in governor pressures causes, prematurely, a shift that should not occur until the vehicle had attained a greater speed. The action occurs quickly and the shift control valves move completely from the position shown in FIG. 6 through to the position shown in FIG. 8 with only a short instantaneous time in the position shown in FIG. 7. This action can take place so quickly that it merely may be a slight deviation in the drop of engine speed and a very minor deviation in the car acceleration indicator. Although the abnormal shift pattern can be detected by an operator acquainted with the use of the automatic equipment described in connection with FIG. 3 above, the presently skilled transmission mechanics usually, if not invariably, fail to detect the brief instant during which the transmission was in second speed. The abnormality is diagnosed as a 1–3 shift and the cause of the condition is diagnosed as a faulty governor valve or faulty shift valves. The manufacturer's manuals further point out specific part failures which can cause a 1–3 shift. However, as pointed out in connection with FIGS. 6, 7, and 8, there was actually a 1–2 shift followed quickly by a 2–3 shift. Manufacturer's manuals do not list potential component failures that could cause a 1–2–3 shift.

Accordingly, in keeping with the method and the mechanism described in connection with FIG. 3, it is preferred that recording equipment which can make instantaneous and permanent records for later analysis and comparison be utilized. By way of example, the shift pattern mentioned above will be described in connection with a printed strip chart which responds to primary pressure from the pressure regulator 154 and crank-shaft speed and car speed.

The use of a recording of performance permits any shift malfunction to be accurately defined. Every factor and/or component that could affect each shift is tested under two or more conditions by operating the vehicle in a programmed pattern. A study of the record and a comparison of each trace with established norms permits the operator to quickly identify the malfunction and the cause.

An example is shown in FIG. 10. The "shelf" 217 in the shift pattern in the engine speed trace 205a indicates the transmission was in second speed for less than one-half second. The sudden drop in the line pressure trace indicates a sudden increase in the speed responsive hydraulic pressure. The fact the 1–2 shift occurred at normal speed indicates the speed-responsive hydraulic pressure was correct up until the sudden increase (i.e., the pressure-control valve had not stuck and suddenly released). It is thus apparent there is a cross-leak from a source of higher pressure into the governor pressure circuit. This cross-leak might have occurred when line pressure oil was introduced into oil circuits directed to the elements (band and clutch) that are engaged in second speed. A glance at the time-line on the chart tells whether the sudden malfunction in governor pressure pressure occurred during first, second, or third speed or during the shifts (relation of hydraulic pressure and engine speed traces at a specific time). This knowledge permits the mechanic to predict the source of the cross-leak. Knowledge of the location and cause of the malfunction permits the mechanic to quote the cost of repair (labor and parts) before the transmission is removed from the car.

It is within the scope of this invention to operate tests in substantially a completely automatic manner by establishing a sequence of norms establishing parameters characteristic of functions of parts of a given transmission from a given source of manufacturer, which norms and parameters can be encoded and programmed. For the purpose of practicing the method manually, it is presently preferred that charts are used and norms established on such charts which can serve as masters and with which a given transmission can be compared for ascertaining functions relative to parameters, which functions may vary from these norms within tolerable limits or may exceed these norms and be intolerable and indicate malfunctions of the transmission.

FIG. 9 shows a portion of chart 65 on which the solid line 205 indicates engine r.p.m. The broken line 206 is indicative of primary oil pressure or line pressure in the transmission, the solid line 207 is indicative of car speed and starting on the left side of the chart shows acceleration from zero to 35 miles per hour in approximately 16 seconds and deceleration to zero in approximately 12 seconds. This portion of the chart has been selected because it displays the normal function, or norm, which demonstrates the malfunction described above caused by crack 150 in the casting which caused a faulty 1–2 and 2–3 shift, FIG. 10, in such manner that it would appear to a skilled mechanic to be the same as a 1–3 shift, which in fact it is not. As indicated by the line 205 of the chart, the engine is idling initially at approximately 500 r.p.m. At this point, the accelerator 162 of FIG. 6 is depressed to the position shown to cause acceleration first in the first gear to approximately 1000 r.p.m. indicated at point 209 on line 205. A shift will occur at this time due to the action of the 2–3 shift valve, FIG. 7, opening line 195, to the front servo 186 and the action of the 1–2 shift valve shutting off supply of fluid to the rear servo 186, FIG. 6. The portion of the curve 205 between the point 209 and a point 210 is a normal second speed continuation of acceleration of the vehicle substantially between 12 miles per hour and 20 miles per hour indicated at points 211 and 212 on the vehicle speed line 207. At 20 miles per hour, the governor 170, FIG. 8, will have increased governor pressure to further move the 2–3 shift valve to shut-off fluid supply to the front band servo 186 and applied pressure to the rear clutch, to operate the rear clutch 197, to place the transmission in third speed, which is maintained until a speed of 35 miles per hour is attained at the point 214 of curve 207; whereupon the throttle pressure is removed and the speeds of the vehicle and the engine return to their initial conditions.

A normal line pressure 206 builds up from approximately 55 pounds to substantially 75 pounds in the first 4 seconds, and then decreases in the next 6 seconds to approximately 65 pounds. When the output shaft is rotating sufficiently fast to cause a rear pump connected with the output shaft to supply most of the fluid needed by the transmission a check valve shunts the pressure from the front pump (pressure shown as line 206) to the convertor at approximately 40 p.s.i. point 215 on line 206. At point 216 the pressure is shown as rising for the vehicle speed, line 207 has dropped to where rear pump output is no longer adequate. It is to be noted that certain operations which employ a plurality of parts is preferably repeated particularly when they are of short duration, so that the presence of sticky parts can be readily determined.

The vacuum pressure line 219, by way of example, is shown as peaking at points 218 which may be done conveniently by the operator with the same mechanism used to reset the second hand 129, of the clock 128, of the indicator 30, FIG. 3. Of course, any of the indicators could be so-peaked if desired. The induced peak serves as a marker to identify the start or end of a test increment. In the particular transmission W, used by way of example, the throttle pressure is not vacuum modulated. However, certain of the transmissions of the same manufacturer are thus modulated and the vacuum pressure curve therefore is herein indicated for use of the same chart for establishing norms when such transmissions are tested. Likewise, temperature is a factor in certain malfunctionings and the line 220 indicates a constant temperature of approximately 180° which is normal for the W transmission.

FIG. 10 shows a step of a test, the same as shown in FIG. 9, but indicating the malfunction caused by the crack 150 in the casting 151. The engine speed line 205a shows acceleration up to the point 209a in substantially the same elapsed time as shown in FIG. 9. However, the point of the 2–3 shift 210a occurs in a fraction of a second after the 1–2 shift. In the speed curve 207a there may occur a very minute plateau 211a. Even a skilled operator could fail to read such a deviation on a speedometer type device because these are damped to eliminate minor deviations; and if not damped, such vibrations occur frequently and occasionally spasmodically. These deviations, if observed at all, could be mistaken for a 1–3 shift whether observed at 211a in the vehicle speed direct reading indicator or if read on a direct reading engine r.p.m. indicator; again because such indicators are subject to vibration of vehicle parts and hence can render erroneous instantaneous indications.

It will be noted that between the points 209a and 210a there is a plateau 217. The recorder mechanism is removed from the vicinity of vehicle vibrations or isolated from same as by being on the seat as in FIG. 2 and thus can record this plateau. The plateau is a clear indication that a 1–2 shift occurred, and was substantially immediately followed by a 2–3 shift. Accordingly the operator knows that the 1–2 and 2–3 shift mechanism, FIGS. 6, 7, and 8, did function, functioned in sequence and, accordingly, were neither sticky or stuck in a given position.

By further reference to the chart in FIG. 10, the operator will thereby verify that the slight plateau 211a in the vehicle speed curve was actually caused by the sudden lowering of torque transfer from the engine to the vehicle drive shaft because of having passed into third speed range almost directly from the first speed range and the rate of acceleration of the vehicle diminished. The observer would note further that the line pressure curves 206 and 206a were comparable and correct and would probably repeat the curve a few times, not shown, to verify the observations.

From this point in the test program, there would be only a few of the mechanisms at fault. The operator could, therefore, refer to another portion of the norms to bring into effect those parts of the transmission that could be at fault and thus causing the fast 1–2, 2–3 shift.

FIG. 11 shows a different type chart 65a which contains norms substantially identical to those shown in FIG. 9. It is found that different transmissions of different manufacture have characteristics most easily read from different types of charts. The vehicle speed on the chart of FIG. 11 is indicated by a norm curve 221 and acceleration and deceleration are shown as repeating and containing markers 222, showing the beginning and end of a step in the test program. The engine speed curve 223 shows information substantially identical to curve 205 of FIG. 9. Line 224 is a primary pressure curve showing substantially identical information to line 206, FIG. 9, and the vacuum pressure line 225 indicates substantially the same norm as shown by line 219 of FIG. 9. The line 219T records temperature.

FIG. 12 shows a curve 230 that is not projected to comparable unique parameters as in the case of the prior two charts, but comprises the algebraic addition of the engine r.p.m. and vehicle speed. In different gear engagements there are different speed relationships that do not conform to numerical indication. It is to be noted, however, that the significant points 209b, 210b and 214b are sharp and well defined and thus capable of indicating the malfunctions defined above and in substantially the same manner. The primary pressure 206b is shown as containing substantially identical indication as the curve 206 of FIG. 9.

The curve 230 can be plotted through a mechanical algebraic adding device 235, using a signal generator comprising the magnet 137 and pole pieces 136N and 136S and a signal generator 135, substantially as shown in FIGS. 4 and 5. An adding link 236 has a pivot 237 at its center point connected with a drive rod 238 to the signal generator 235. A pair of positioning devices 240 of any of several manufacturers are adapted to differentially and preferably lineary move the ends of the link 236 in accordance with signals received from the distributor 43, indicative of engine r.p.m. and the signal generator 44, indicative of output shaft r.p.m. or vehicle speed. As the vehicle speed rises the lower end of the link 236 is moved toward the left, and back toward the right on deceleration. As engine speed increases the upper end of the link 236 is moved toward the right, and back toward the left as the engine speed decreases. Thus, the conjoint action of the engine r.p.m. and the vehicle speed will be added algebraically and fed through a conductor 241 to the recorder 35, FIG. 3.

The No Reverse condition mentioned briefly in the foregoing general discussion is charted in FIGS. 14 and 15. In this case the basic transmission involved is identified on the foregoing basic transmission diagram as W, and the charts are on strips having a format like that shown in FIG. 11. Predetermined steps in a program of operating function indicia appear as curves on the charts with same moving from right to left, and FIG. 14 being a lefthand projection of FIG. 15. The norms in each instance are plotted in broken lines adjacent malfunctions.

The transmission is operated through predetermined tests Nos. 4, 5 in part, 7 in part, 10, and 14, which, as will be explained below, define a malfunction caused by a stuck-closed inhibitor valve, not illustrated. In test 4, the shift selector is placed in reverse and the engine speed caused to approach 3000 r.p.m. as indicated by line 250. The primary line pressure indicated by line 251 raised to approximately 90 pounds, whereas it should have risen to approximately 200 pounds as indicated by the dotted norm line 252. At the lower part of the chart a normal reverse is indicated by the dotted norm line 253 but no reverse movement occurred as indicated by the heavy broken line 254.

In test 5, the selector mechanism is set to the drive position and the engine r.p.m. brought up from approximately 500 to 1700 r.p.m. as indicated by the line 255. The vehicle speed would accelerate as indicated by line 256 from zero miles per hour to approximately 35 miles per hour at point 257. It is noted that a 2–3c down-shift occurred at approximately 1400 r.p.m. A normal shift should have occurred at the broken line peak 260. This abnormality indicates that the 1–2 shift function did not occur.

In that portion of the chart indicating test 7, the car is decelerated according to the curve 261 from 35 miles per hour to zero. The engine r.p.m. decelerates along line 263 to approximately 550 r.p.m. wherein a 3–2c down-shift occurs as indicated in the engine r.p.m. curve 250. This indicates a malfunction because the transmission should have down-shifted to first speed rather than to second speed.

Referring now to FIG. 15, the left side of the chart indicates test 10 for which test the operator places the selector in first speed and accelerates the vehicle from zero to 35 miles per hour as indicated by car speed line 265. Other indicia are the engine r.p.m. solid line 266, line pressure line 267 and engine vacuum line 268, only the latter of which is indicating proper function for this phase of the test as well as for test 14 to follow. It is to be noted that a proper function of engine r.p.m. should have followed the broken line 270 and the hydraulic pressure should have followed a proper pressure line 271. Because these functions did not approach the norms, certain elements of the transmission are called into play further in test 14.

For that portion of test 14 appearing on the chart of engine r.p.m. lying between the points 272 and 273, the selector is placed in Drive position, the brakes are applied, the engine is caused to operate at approximately 1000 r.p.m., the throttle pressure is separately caused to vary between minimum and maximum values. The hydraulic pressure of line 266 is represented by peaks 275 of the line pressure which show approximately 160 pounds of pressure and is a parameter within the established norms for the particular transmission W. At the point 276 in the pressure curve 267, the selector is moved to reverse when the engine r.p.m. drops to approximately 500 and the slight dip in the curve is caused by fluid filling of parts called into action by this setting of the selector. Again the throttle pressure is varied between minimum and maximum values. A normal pressure peak 277 is lacking in the pressure curve 267. Operation of the engine at approximately 1000 r.p.m., again with the brakes applied, indicates that the pressure at points 280 attain only approximately the same pressures as attained in first speed. A norm at this point is indicated by broken line peaks 281 and the pressure should have exceeded 180 pounds per square inch.

The primary malfunction No movement with the Selector in Reverse was revealed in test 4. As aforementioned, manufacturer's service manuals categorize a variety of components malfunctions which could be potential causes of this primary malfunction, some of which are shown in the following chart B. Test 5 reveals a number of components, suspect in test 4, to be performing correctly to indicate and post portions of lines representing pressure, engine speed and vehicle speed that are within norms. Tests 5, 7, and 10 reveal and confirm another primary malfunction not readily discernible to the transmission mechanic. Out of the several components that could cause the No Reverse condition only those that could cause both a No Reverse and a No First Speed condition are still suspect. This resolves to but two components. Test 14 involves operation of but one of the two suspected components. The fact that pressures at points 280 are not within the established norm, and the fact that the results of another test involving the second suspected component was within norms, confirm the fact the inhibitor valve is stuck closed. The faulty component indicated its malfunction in each of the above steps. Thus, a part located interior of the transmission assembly is revealed to be at fault without having to disassemble the transmission for a visual inspection.

The chart B comprises a portion of a master chart showing the No Reverse malfunction and defines a stuck-closed inhibitor valve.

CHART B

| | Rear Band too Loose | Broken Servo-to-Band Link | Rear Band Broken | Broken Servo Body | Inhibitor Valve Sticky | Inhibitor Valve Stuck Closed | Rear Servo Lockout Valve Sticky | Rear Servo Lockout Valve Stuck Closed | 1-2 Shift Valve Stuck Closed | 2-3 Shift Valve Stuck Closed | Oil Delivery Bushing Loose | Planetary Unit Broken | Rear Clutch Drum Broken | Rear Clutch Piston Broken | Internal Hydraulic Leak in Rear Clutch Circuit |
|---|---|---|---|---|---|---|---|---|---|---|---|---|---|---|---|
| No Reverse | X | X | X | X | O | X | O | X | X | X | O | X | X | X | X |
| Starts 2nd speed—D1 | | | | | O | X | | | X | | | | | | |
| Starts 2nd speed—L | | | | | O | X | | | X | | | | | | |
| No 3-1 Passing Gear—D1 | | | | | O | X | | | X | | | | | | |
| Manual Shift to Low at 35 mph.: No 2-1 shift | | | | | O | X | | | | | | | | | |
| 2-N shift | X | X | X | | | | O | X | | | | | | | |
| No 3rd speed—D1 or D2 | | | | | | | | | | | | | X | X | X |
| Starts in third speed—D2 | | | | | | | | | | X | | | | | |
| No 3-2 Passing Gear—D1 or D2 | | | | | | | | | | X | | | | | |
| No Drive—D1 | | | | | | | | | | | | X | | | |
| No Drive—D2 | | | | | | | | | | | O | X | | | |
| Control Pressures: Low in "R" | | | | | X | O | | O | X | X | | | X | X | X |
| Low in "L" | | | | | X | O | | O | X | | | | | | |
| Low in "P" | | | | | X | O | | | | | | | | | |
| Low in "R" at Max. Throttle | | | | | X | O | | | | | | | X | X | X |
| Same in "D1" and "R" at Max. Throttle | | | | | | O | X | O | X | | | | | | |

X=Operational malfunction that *must* occur if component in question is malfunctioning in the manner described.
O=Operational malfunction that *might* occur if component in question is malfunctioning in the manner described.

It is to be noted from data on this chart B for the No Reverse (top line) that all of the bottom listed operational malfunctions could exist. It is to be further noted that the functions listed from No Reverse, down to Max. Control pressure same in "D1" and "R" at Max. Throttle (bottom line) provide X markings in matrix intercept relationship with the Inhibitor Valve Stuck-closed malfunction the sixth down in the list at the bottom of the chart B. The X markings indicate operational malfunctions that must occur if the component in question is malfunctioning in the manner described.

The X markings occur for the stuck-closed inhibitor valve as follows, reading down: there is no reverse, starts in second speed—D1, starts in second speed—L, no 3–1 passing gear—D2, in manual shift to low at 35 m.p.h., there is no 2–1 shift, and control pressure is the same in "D1" and "R" at Max. throttle (bottom line of matrix). These six indications define the malfunctioning part specifically. It is to be noted that if there had been a 2–1 shift in manual shift to low at 35 m.p.h., and had the control pressure in "R" been within norms at maximum throttle, the malfunctioning would have been defined as the 1–2 shift valve stuck-closed in the 9th line from the top in the list of operational malfunctions at the bottom of the chart.

From the foregoing description it will be apparent that an established test procedure was followed and the results compared with a sequence of norms. Deviations from these norms enabled the operator to discover the malfunctioning component in a few minutes, including the time for disconnecting the throttle linkage so that throttle pressure could be separately caused to vary between minimum and maximum values. Thus, an accurate repair estimate can be made.

While only tests Nos. 4, 5 in part, 7 in part, 10 and 14 were required for the No Reverse malfunction, obviously these and other tests are used to discover other malfunctioning parts and components. For the above transmission W, a typical, although not to be considered restrictive test, comprises the following 18 test steps defining norms and operational parameters established thereby. Tests Nos. 1 and 2 test the amount of wear on the front pump (primary fluid) and any tendency the pressure regulator may have to be sticky.

Test No. 1, idle the engine at 500 r.p.m. with the selector in N position and throttle rod disconnected and positioned to produce maximum throttle pressure. The pressure should be 150 p.s.i.; and the pressure in N positions should be the same at the end of each test. Shift from N to D–2. The pressure should drop about 50% of N p.s.i. and return in 2 seconds or less to within 30 p.s.i. of N pressure (120 p.s.i. or over). The r.p.m. should diminish 50 r.p.m. within one second after the p.s.i. dip (engagement test). In N position the pressure rises to 150 p.s.i. and the engine turns up to 500 r.p.m. Shift N to D–1, pressure drops suddenly and returns within two seconds to 120 p.s.i. or over but should be not more than 5 p.s.i. lower than in D–2, r.p.m. slows 50 r.p.m. Shift D–1 to N, r.p.m. rises 50 r.p.m. pressure rises to 150 p.s.i. Shift N to L, pressure drops and rises in two seconds to N pressure, engine r.p.m. is lowered, pressure rises to equal or exceed N pressure. Shift L to N to R, pressure drops to about 40% of N p.s.i. and returns in about 2½ seconds or less to within 15 p.s.i. of pressure in L position. Shift R to N to P, pressure drops, but rises quickly to equal L pressure, engine turns at 500 r.p.m. Shift P to N, and pressure should register 150 p.s.i.

Test No. 2. In N position and with the throttle rod in same position as in test No. 1, accelerate engine from 500 to 1000 r.p.m. in about 5 seconds. Pressure in N, D–2 and D–1 should crest at a value between 150 and 180 p.s.i. when engine speed attains 600 r.p.m. Decelerate to 500 r.p.m. shift progressively at 12 second intervals from N to D–2 to D–1 to L, decelerating to idle 500 r.p.m. between each shift. Pressures in N, D–2 and D–1 should be within 10 p.s.i. of each other. Pressure in R should be at least 30 p.s.i. more than N pressure, or 180 p.s.i. Pressures in R, L and P should crest at a value between 180–240 p.s.i. when engine speed attains 800 r.p.m. Pressures in L, R, and P should be within 15 p.s.i. of each other. Shift R to N, norm should be 150 p.s.i. at 500 r.p.m.

Test No. 3 compares control pressures against specifications established from service manuals and/or compiled data.

At twelve second intervals accelerate and decelerate engine between 500 and 1000 r.p.m. Shift at twelve second stages progressivley from P to N to D–2 to D–1 to L to R to P. In N when the r.p.m. increases from 500 to 1000 r.pm., the pressure should not be more than 15 p.s.i. greater than at idle. Both D–2 and D–1 pressures should be in the 80–85 p.s.i. parameter. The R and L pressures should be within the 180–215 p.s.i. parameter with 195 p.s.i. being the norm, and R and L should be within 15 p.s.i. of each other. Pressure in P should be above 125 p.s.i. but below the pressures in R and L.

Test No. 4 with drive in reverse, checks the power flow and sticky throttle and/or modulator valves. The engine is accelerated from 500 to 1500 r.p.m. This acceleration-hold-deceleration takes about 15 seconds. The control pressure trace should rise from idle pressure smoothly to 180 p.s.i., and drop abruptly when the acceleration is released. Vehicle speed should be indicated at 6 m.p.h. at 850–1000 engine r.p.m. and 12 m.p.h. at 1200–1450 engine r.p.m.

Test No 5 tests the drive 1–2 and 2–3 up-shift for pattern and quality and compares speed at shift points with specifications, checks the operation of the governor and shift valves and checks the operation of pump check valves. The entire test takes approximately 45 seconds and the vehicle is accelerated smoothly from zero to 35 miles per hour. The two shifts, 1–2 and 2–3, should occur within 7 to 10 m.p.h. of each other. The 1–2 shift preferably occurs at 12 miles per hour and the 2–3 shift at approximately 20 miles per hour. Engine speed should be within 100 r.p.m. of the R shift at 6 miles per hour. The m.p.h. trace should be smooth at the shift points. The engine speed in first gear should accelerate smoothly and at the 1–2 shift point should drop 10 to 20% in 1½ seconds or less. At the 2–3 shift point, the engine r.p.m. should reduce from 10 to 15% in 1½ seconds or less. The crest of the second 2–3 shift point should be equal to or above the crest of the engine speed at the 1–2 shift point.

The first gear speed should compare with the vehicle speed as follows: at 10 miles per hour the engine speed should be 1000–1300 r.p.m.; at 14 m.p.h. at 1300–1600 r.p.m.; at 30 miles per hour 2600–3200 r.p.m.; in second speed at 10 miles per hour engine speed shoud be 950–1150 r.p.m.; at 14 miles per hour, 1050–1300 r.p.m.; at 30 m.p.h.; 1650–1900 r.p.m.; at 50 m.p.h., 2550–3250 r.p.m. In third speed, at 14 miles per hour, below 850 r.p.m.; at 30 m.p.h., below 1500 r.p.m.; at 50 m.p.h., below 2400 r.p.m.

The governor should cause the line pressure to decrease slightly after the 1–2 shift and the front and rear pump check valves should operate at 20 to 30 miles per hour. The pressure recording then shows a drop to indicate converter pressure and at this vehicle speed the converter pressure should be between 25–60 p.s.i.

Test No. 6 tests the 3–2 passing gear and the 2–3 lift-foot shift and observes the quality of the shifts. With the accelerator depressed fully the engine r.p.m. will quickly attain 2550–3250 at 55 miles per hour vehicle speed. The r.p.m. trace should be smooth, both up to the maximum speed and down therefrom after the 2–3 lift-foot shift which occurs about ½ second after the accelerator is released. The m.p.h. trace should not dip or flatten out at the lift-foot shift but should indicate steady deceleration. There may be some ripples caused by the car rocking during this test but such ripples do not indicate any malfunction. The degree to which the pressure will rise depends on the way the accelerator is used. Pressure should rise to 60 p.s.i. at least, and should not rise as much as it did at 1000 r.p.m. in Test No. 1. After the lift-foot shift, the pressure decreases sharply and may or may not show a shelf as the pressure drops.

Test No. 7 tests the 3–1 passing gear, the 1–3 lift-foot shift and the 3–1 coast-down shift, and renders observations of the quality of shifts and checks the operation of the pump check valves. The 3–1 passing shift causes a sharp increase in engine speed from 500 to 2600–3200 r.p.m. at 35 m.p.h. in approximately 2½ seconds at which time a 1–3 lift-foot shift is performed. Both the vehicle speed and engine r.p.m. should accelerate and decelerate smoothly and the 3–1 coast-down shift should occur at approximately 8 to 10 m.p.h. at which time the engine r.p.m. will decrease from 500 to about 450 r.p.m. The control pressure should rise sharply and smoothly on acceleration. On deceleration at 20 to 12 m.p.h., the front and rear check valve should operate, which function is indicated by an upward trace of the pressure curve.

Test No. 8 tests the 1–2 up-shift and 2–1 coast-down shift and checks for erratic shift pattern and quality of the 2–1 coast-down shift. The m.p.h. trace should be smooth at shift points and the 2–1 coast-down shift should occur within 2 m.p.h. of the speed in 3–1 down-shift of Test No. 7. The engine r.p.m. at the 1–2 shift should occur within 2 m.p.h. of the same speed as in Test No. 5. Engine speed should be at idle speed at the 3–1 and 2–1 down-shift if the one-way sprag clutch functions correctly and should drop about 50 r.p.m. when the shift occurs.

Test No. 9 tests heavy throttle up-shift quality and manual down-shift. The m.p.h. trace should be smooth at up-shift. The transmission should 3–2 down-shift as soon as the selector is moved to Low. The inhibitor valve should prevent 3–1 down-shift. The throttle is depressed and the engine accelerates less than 4 seconds from 500 r.p.m. to 2500 r.p.m., approximately. At this point, the test procedures calls for the driver to ease back on the throttle after the 1–2 shift to cause the 2–3 shift to occur before 50 miles per hour. At about 55 miles per hour, the throttle is released and the deceleration trace is smooth except for slight dips of less than 2 miles m.p.h. at 3–2 and 2–1 down-shifts, the latter of which should occur between 30 and 15 miles m.p.h. Control pressure should go above 85 p.s.i. then decrease. Governor pressure builds up and mainline pressure is reduced and should drop to converter pressure at or before release of the accelerator. The 1–2 and 2–3 up-shifts should occur within about 10 seconds of each other and manual down-shifts 3–2 and 2–1 are performed at approximately 35 and 20 m.p.h., respectively. The engine speed trace should peak smoothly and significantly at shift points with r.p.m. changes of about 300 r.p.m. on down-shift.

Test No. 10 checks operation in low and checks the operation of the pressure regulator. In this test the transmission should not up-shift. The engine speed curve at 10, 14 and 30 m.p.h. are checked against the values specified in Test No. 5. The r.p.m. and m.p.h. traces should be similar to each other in shape but not in size. The p.s.i. trace should rise abruptly and smoothly before engine speed reaches 800 r.p.m. The p.s.i. trace should drop abruptly to converter pressure as soon as the accelerator is released.

Test No. 11 checks the 2–3 up-shift, 3–2 passing gear, 2–3 lift-foot shift quality in D–2 position and compares with results in Test Nos. 5 and 6. The engine speed is checked at 10 and 14 miles per hour with the data of Test No. 5 to assure the transmission started in second speed and all shifts should be compared with the shifts of Test Nos. 5 and 6. The engine speed should be within 200 r.p.m. of that in Test No. 6 at 50 m.p.h. The m.p.h. trace should be smooth at the 2–3 up-shift point which should occur at about 20 m.p.h. The 3–2 passing gear shift should show a sharp and smooth upward trace of both engine and vehicle speeds. The 2–3 lift-foot shift should result in smooth deceleration speed traces until the 3–2 passing gear is again called into play when they should rise abruptly to vehicle speed to approximately 30 miles per hour and the 2–3 lift-foot shift to about 22 m.p.h. The 3–2 coast-down shift should occur a little below 10 m.p.h. The engine speed at 30 miles per hour should be 1650–1900 r.p.m. The 3–2 coast-down shift should occur at approximately 600 engine r.p.m.

Test No. 13 tests heavy throttle up-shift quality in D–2 position and checks the front band efficiency. The engine speed at 14, 20 and 30 miles per hour is checked with Test Nos. 9 and 11 to show that the front band is not slipping. The vehicle is accelerated rapidly to about 55 m.p.h., decelerated to about 27 m.p.h. when the brakes are applied.

Test No. 14 tests operation of the throttle valve, throttle modulator, and compensator valve. The transmission is operated in the D–1 selector position and reverse R positions and throttle pressure is cycled three times in each position between maximum and minimum values. In D–1 the maximum p.s.i. values should all be equal and within 150–180 p.s.i. The minimum p.s.i. values should be equal within 5 p.s.i. in all six checks. In reverse, the maximum p.s.i. values should all be equal and should be within 180–240 p.s.i. The slopes of the pressure curves are examined for saw-tooth traces or steps that indicate stickiness of valves.

Test No. 15 tests the governor pressure, compensator valve, compensator valve plug and compensator cut-back valve and the front pump check valve. The vehicle is smoothly accelerated to about 55 miles per hour and decelerated to zero. The transmission should remain in second speed throughout the test. Control pressure should decrease about 50 to 60 p.s.i. in a smooth trace as the vehicle speed increases from 5 to 30 m.p.h. Above about 30 m.p.h., the control pressure should be almost constant until the front pump check valve closes which occurs at about 35 to 45 miles per hour at which point the pressure should drop abruptly. During deceleration, at about 30 m.p.h. the pressure should rise within 2 seconds and thereafter, gradually.

Test No. 16 tests the efficiency of the front pump, condition of the pressure regulator valve, the throttle modulator valves, the condition of the compensator valve and the effect of heat on operation of the transmission. The engine is operated between 500 and 1000 r.p.m. in each of the N, D–2, D–1, L, R and P positions. The control pressure is noted and compared with the pressures in Test No. 2. These pressures should not be above the pressures shown in Test No. 2 but they may fall into the ranges set forth below. In the N, D–1 and D–2 positions, the pressure should crest at a value of 150 to 180 p.s.i. by the time the engine speed has reached 800 r.p.m. Pressures in N, D–1 and D–2 should be within 20 p.s.i. of each other. Pressures in R, L, and P, should crest at a value between 180 and 240 p.s.i. when the engine speed is 1000 r.p.m. or less. The pressures in L and P should be within 20 p.s.i. of each other. The pressures in L and P should be at least 30 p.s.i. greater than the pressures in N, D–1 and D–2.

Test No. 17 checks for leakage in hydraulic circuits and tests in selector positions N to D–2, N to D–1, N to L, N to R, and N to P. The hydraulic pressure in N position should be 100 p.s.i. or greater and there should not be more than 5 p.s.i. difference in this neutral pressure after each test. From N to D–2 the pressure drops rapidly and rises again in two seconds or less, the engine slows about 50 r.p.m. and the pressures in D–1 and D–2 should be above 60 p.s.i. but not above the pressure in N position. The pressures in L and R should not be less than pressures in D–1 and D–2 nor more than 30 p.s.i.

greater than pressure in D-1 and D-2. The pressures in N and R positions should be within 10 p.s.i. of each other. The pressure in P position should be about the same as the pressure in L position.

Test 18 checks for erratic shift patterns during light and moderate acceleration. The temperature of the transmission should be over 185 degrees Fahrenheit before starting this test. The shift quality and pattern and the control pressure quality and pattern are noted and compared with the patterns of Test Nos. 5 and 6. These patterns should be similar except that the control pressure pattern will peak at a higher value when acceleration is greater.

During tests 14 to 18, inclusive, the operating temperature of the transmission is substantially above that during tests 1 to 3, inclusive. Malfunctions related to temperature are thus defined.

There can be intermediate and other tests than the eighteen tests described above. For example, with transmissions providing taps for pressure connection to certain of the elements that can malfunction as pointed out hereinabove, such malfunctions can be more specifically defined by testing other oil circuits serving those elements. The parameters and norms mentioned above can comprise a chart by themselves or can be printed upon the master test sheets in a preferred embodiment of the invention. Of course, other data storing and read-out mechanism can be provided within the scope of the invention.

The above-described method will have brought every component of the transmission into use in several phases of operation at different times. Locations of the faulty parts will become apparent as the sequential tests are performed, and their presence will be known because of deviations from norms in tests involving same. Once proper operation is established for a transmission of a given kind, and having parameters of acceptable operation adjacent these norms, tests can be made in facile manner.

The foregoing specification has been directed to only two specific examples of malfunctions of which the machine and method for testing is capable of identifying without opening up the transmission for manual inspection. It is to be understood that there are a large number of malfunctions that could be explained further. However, it is considered within the scope of others skilled in the art with reference to the foregoing disclosures and the specific examples, and in keeping with the general discussion in the beginning of the specification, to apply the steps and equipment to ascertain such malfunctions. Accordingly, it is to be understood that I am not to be limited in the disclosure of mechanism and method to the specific means and steps involved but by the scope of the subjoined claims.

I claim:

1. Apparatus connectable to automotive vehicle parts for in situ testing of a hydraulic fluid automatic transmission while said transmission is being operated through predetermined cycles of operation:
    (a) said transmission having input and output shafts;
    (b) said testing apparatus comprising first means for measuring the speed of said input and the speed of said output shaft;
    (c) second means for measuring hydraulic fluid pressure; and,
    (d) recording means connectable to said first and second measuring means for producing continuous line graphs, representative of said speeds and of said hydraulic fluid pressure, plotted against time for said predetermined cycles of operation of said transmission.

2. An apparatus as in claim 1 further including means responsive to the operation of said first and second measuring means for displaying measurements made by both said measuring means in timed relationship with each other.

3. A method of in situ testing an automatic hydraulic transmission wherein norms of output parameters representative of the operation of the transmission being operated through predetermined cycles of operation are established, said method including the steps of:
    (a) operating said transmission through predetermined cycles of operation according to a first test program for causing selected elements of said transmission to function;
    (b) generating a first record of selected output parameters representative of the operation of said transmission in accordance with said first test program;
    (c) operating said transmission through at least another predetermined cycle of operation according to at least another test program for causing certain of said selected elements and other selected elements of the transmission to function;
    (d) generating at least another record of selected output parameters representative of the operation of said transmission in accordance with said other test programs;
    (e) ascertaining from said records of said test programs which of said records deviate from the established norms;
    (f) registering those of said programs which produce records which deviate from said norms; and
    (g) deriving from said latter programs an indication of those elements of said transmission which are operated in common by said latter programs;
    whereby an element causing operation of said transmission which deviates from said norms may be detected.

4. The method of claim 3 wherein steps (e) and (f) consist of:
    (e) ascertaining from said records of said programs the amount by which said records deviate from the established norms; and
    (f) registering those of said programs which produce records which deviate from the established norms more than a selected amount.

5. A method as in claim 3 wherein steps (b) and (d) consist of:
    (b) plotting a first record of selected output parameters representative of the operation of said transmission in accordance with said first test program; and
    (d) plotting at least another record of selected output parameters representative of the operation of said transmission in accordance with said other test programs.

6. A method as in claim 3 wherein the steps (b) and (d) consist of:
    (b) recording the hydraulic pressure in said transmission, and the differential speed of the input and output shafts associated with said transmission in accordance with said first test program; and,
    (d) recording the hydraulic pressure in said transmission, and the differential speed of the input and output shaft associated with said transmission in accordance with said other test programs.

7. A method as in claim 3 wherein the following step is in lieu of steps (e) and (f) and consists of:
    (e′) comparing said records to select those programs which produce records which deviate from the established norms.

8. An apparatus for testing in situ the operating characteristics of an automatic hydraulic transmission of an automotive vehicle while said transmission is being operated through predetermined cycles of operation, said vehicle including an engine energizing said transmission, and drive wheels driven by said transmission, said apparatus comprising, in combination:
    (a) first means energizable by said vehicle for obtaining a first signal representative of the speed of said engine;

(b) second means energizable by said vehicle for obtaining a second signal representative of the speed of said drive wheels; and, (c) means for simultaneously recording said first and second signals as a continuous line graph;

(d) whereby operating characteristics of said transmission may be determined.

References Cited by the Examiner
UNITED STATES PATENTS

| | | | |
|---|---|---|---|
| 2,438,588 | 3/1948 | Tolson | 73—156 X |
| 2,975,402 | 3/1961 | Miller | 73—156 X |
| 3,050,994 | 8/1962 | Heigl et al. | 73—117 |
| 3,060,730 | 10/1962 | Lucia | 73—118 |
| 3,071,762 | 1/1963 | Morgan | 340—347 |

OTHER REFERENCES

Book by Commercial Trades Institute, "Automatic Transmissions." Chicago, McGraw-Hill Book Co., Inc., 1955. Pages 137, 138, 141, 142, 186, 230.

Crouse, W. H. Automotive Transmissions and Power Trains., 2nd ed., N.Y., McGraw-Hill Book Co., Inc., 1959, pages 454, 455, 607, 608.

Crouse, W. H. "Automotive Transmissions and Power Trains," 2nd ed., N.Y., McGraw-Hill Book Company, Inc., 1959, page 499.

RICHARD C. QUEISSER, *Primary Examiner.*

DAVID SCHONBERG, *Examiner.*

J. W. MYRACLE, *Assistant Examiner.*